(12) United States Patent
Weppelmann et al.

(10) Patent No.: US 10,583,507 B2
(45) Date of Patent: Mar. 10, 2020

(54) METHOD FOR MACHINING A WORKPIECE, TOOL ARRANGEMENT AND TOOTH CUTTING MACHINE

(71) Applicant: GLEASON-PFAUTER MASCHINENFABRIK GMBH, Ludwigsburg (DE)

(72) Inventors: Edgar Weppelmann, Asperg (DE); Juergen Kreschel, Hemmingen (DE); Steffen Fischer, Ramseck am Neckar (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 246 days.

(21) Appl. No.: 15/310,584

(22) PCT Filed: May 21, 2015

(86) PCT No.: PCT/EP2015/001041
§ 371 (c)(1),
(2) Date: Nov. 11, 2016

(87) PCT Pub. No.: WO2015/185186
PCT Pub. Date: Dec. 10, 2015

(65) Prior Publication Data
US 2017/0072485 A1   Mar. 16, 2017

(30) Foreign Application Priority Data

Jun. 5, 2014   (DE) ................. 10 2014 008 475

(51) Int. Cl.
*B23F 5/16*   (2006.01)
*B23F 21/00*   (2006.01)
(Continued)

(52) U.S. Cl.
CPC ............ *B23F 21/005* (2013.01); *B23F 5/163* (2013.01); *B23F 19/102* (2013.01); *B23F 19/10* (2013.01);
(Continued)

(58) Field of Classification Search
CPC . Y10T 409/101113; Y10T 409/101272; Y10T 409/103816; Y10T 409/103975;
(Continued)

(56) References Cited

U.S. PATENT DOCUMENTS 4,739,682 A * 4/1988 Birkestrand ............ B23B 5/163
269/284
5,052,867 A   10/1991 Krämer
(Continued)

FOREIGN PATENT DOCUMENTS

CN   103406602 A   11/2013
DE   2654177 A1   6/1978
(Continued)

OTHER PUBLICATIONS

"Abdachen und Verzahnen in einer Aufspannung Herstellung von Zahnrädern und verzahnten Bauteilen", Werkstatt Und Betrieb, Carl Hanzer Verlag GmbH, Bd. 146, Nr. 11, Nov. 2013, pp. 56-57.
(Continued)

*Primary Examiner* — Alan Snyder
*Assistant Examiner* — Yasir A Diab
(74) *Attorney, Agent, or Firm* — Robert L. McDowell

(57) ABSTRACT

The invention relates to a method for machining a workpiece, wherein, in particular in the skiving process, a toothing is produced on the workpiece in a first machining operation, in which a toothed cutting wheel, which rotates about the axis of rotation thereof and, on a first end face, comprises cutting edges on the toothing thereof, is coupled in a rolling manner to the workpiece which rotates about the
(Continued)

Figure 1:
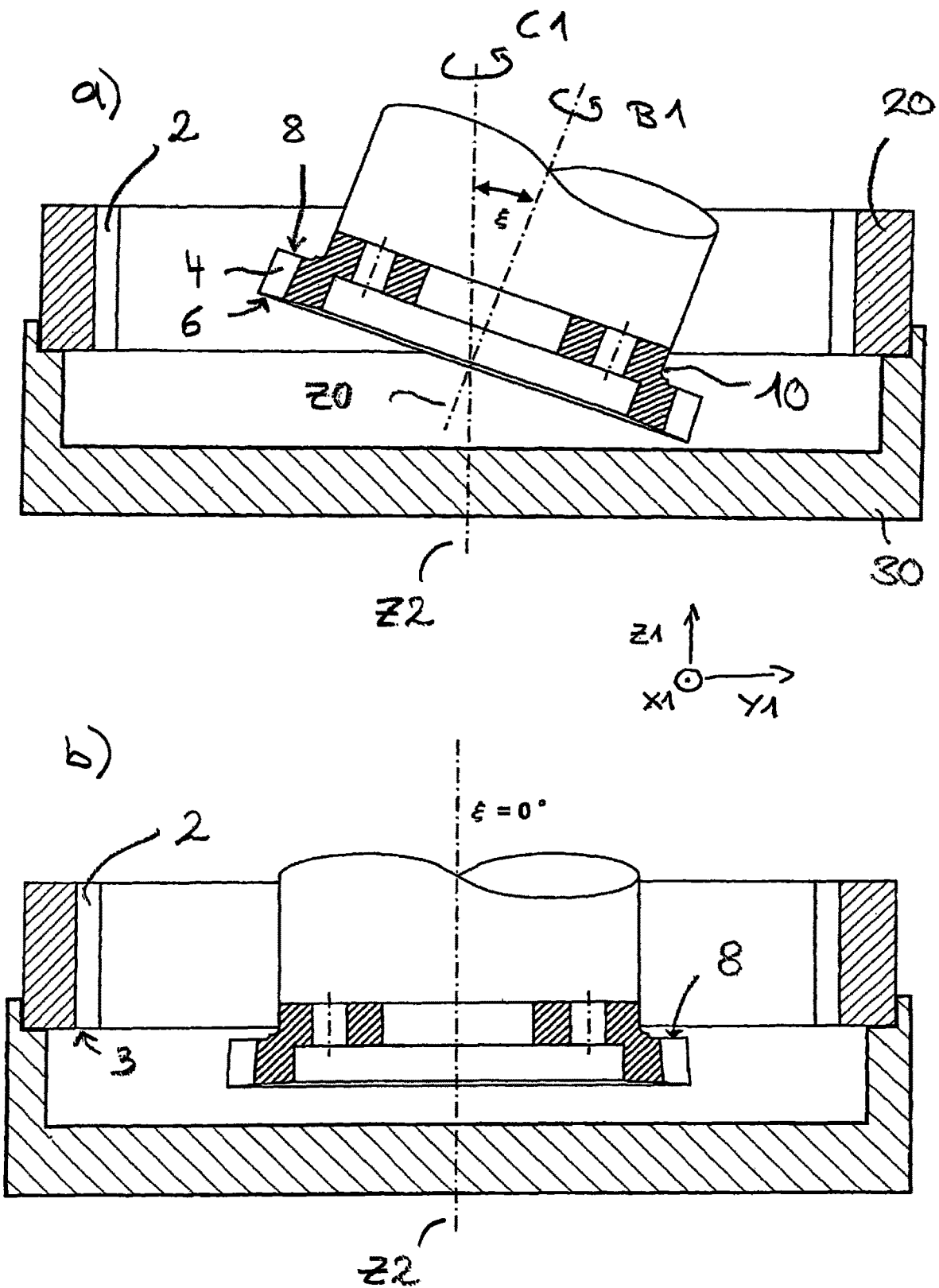

axis of rotation thereof, and a cutting movement of the cutting edges, which has directional components in parallel with the workpiece axis, ends at an axial side of the workpiece toothing, the cutting edges of the cutting wheel forming a first operating region which can be positioned with respect to the workpiece by means of movement axes, and in which, in a second machining operation using a second operating region, the workpiece is machined on the side of the workpiece toothing at which the movement ends, wherein the second operating region can be positioned with respect to the workpiece by means of the same movement axes as the first operating region, and in particular is coupled for movement to the first operating region.

25 Claims, 20 Drawing Sheets

(51) Int. Cl.
*B23F 19/10* (2006.01)
*B23F 21/06* (2006.01)

(52) U.S. Cl.
CPC ......... *B23F 21/06* (2013.01); *Y10T 407/1735* (2015.01); *Y10T 409/101272* (2015.01)

(58) Field of Classification Search
CPC ......... Y10T 409/10477; Y10T 407/174; Y10T 407/1735; B23F 5/163; B23F 5/16; B23F 19/10; B23F 19/101; B23F 21/06; B23F 21/04; B23F 21/10
See application file for complete search history.

(56) References Cited

U.S. PATENT DOCUMENTS

| | | | |
|---|---|---|---|
| 2002/0081163 A1* | 6/2002 | Courtney | B23F 5/12 407/30 |
| 2002/0197121 A1 | 12/2002 | Mall | |
| 2005/0260050 A1 | 11/2005 | Ribbeck | |
| 2009/0142153 A1* | 6/2009 | Prock | B23F 5/163 409/12 |
| 2012/0318384 A1 | 12/2012 | Klingelnberg | |
| 2013/0266391 A1* | 10/2013 | Schweiker | B23F 5/163 409/51 |
| 2014/0234043 A1* | 8/2014 | Nakahara | B23F 5/20 409/12 |

FOREIGN PATENT DOCUMENTS

| | | | |
|---|---|---|---|
| DE | 3934604 A1 | 2/1991 | |
| DE | 4122460 C1 * | 4/1992 | ............. B23F 5/163 |
| DE | 20320294 U1 | 5/2004 | |
| DE | 102007015357 A1 | 10/2008 | |
| DE | 102011009027 A1 * | 7/2012 | ............. B23F 5/163 |
| DE | 102014201110 A1 | 8/2014 | |
| EP | 2537615 A1 | 12/2012 | |
| JP | 2012-171020 A | 9/2012 | |

OTHER PUBLICATIONS

Stadtfeld, Hermann J., "Power Skiving of Cylindrical Gears on Different Machine Platforms", Gear Technology, Jan./Feb. 2014, pp. 52-62.
International Search Report and Written Opinion for PCT/EO2015/001041, ISA/EPO, dated Aug. 31, 2015, 15 pgs.
Search Report from German Patent and Trademark Office for DE 102014008475.2, dated Jan. 30, 2015, 6 pgs.

* cited by examiner

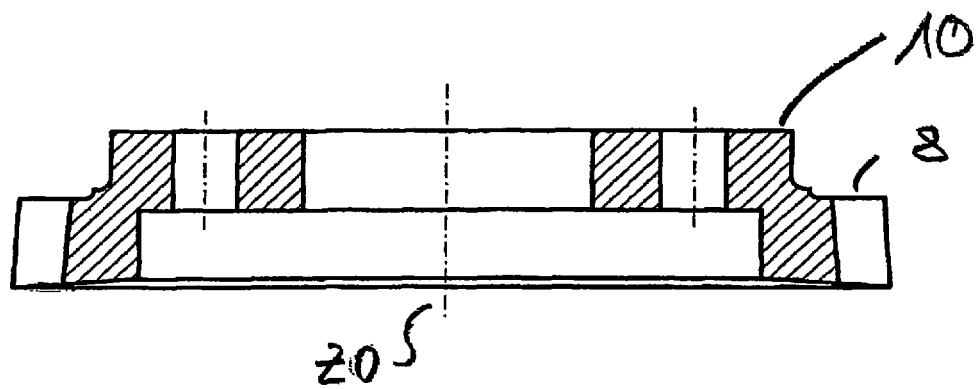
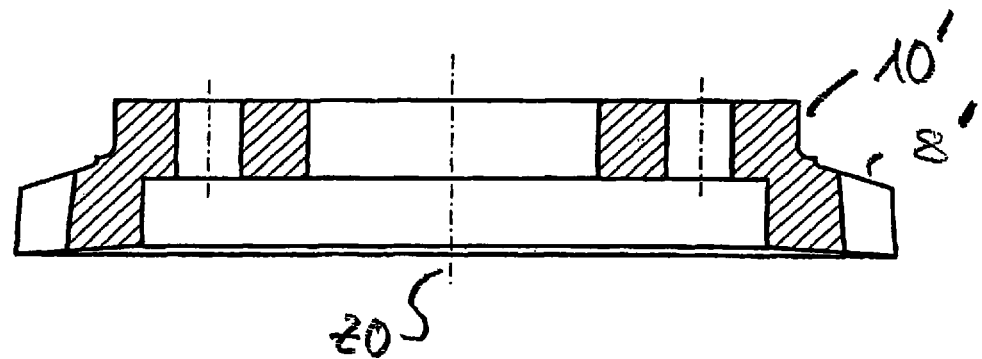
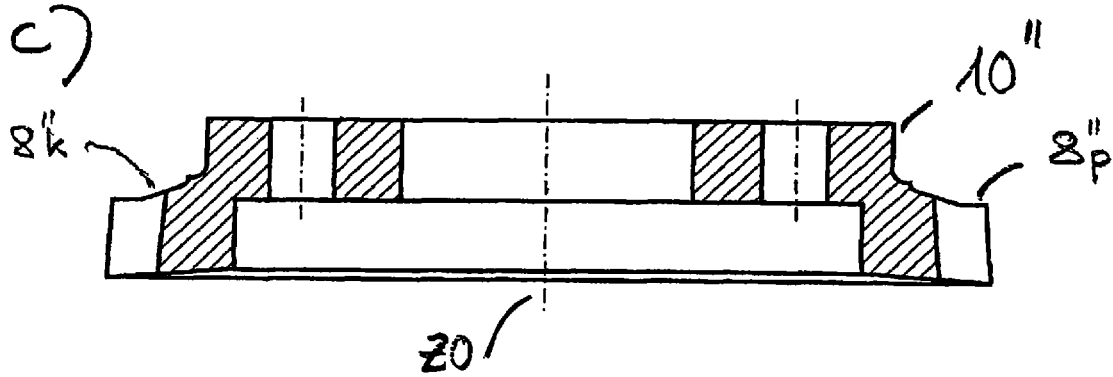
Fig. 3

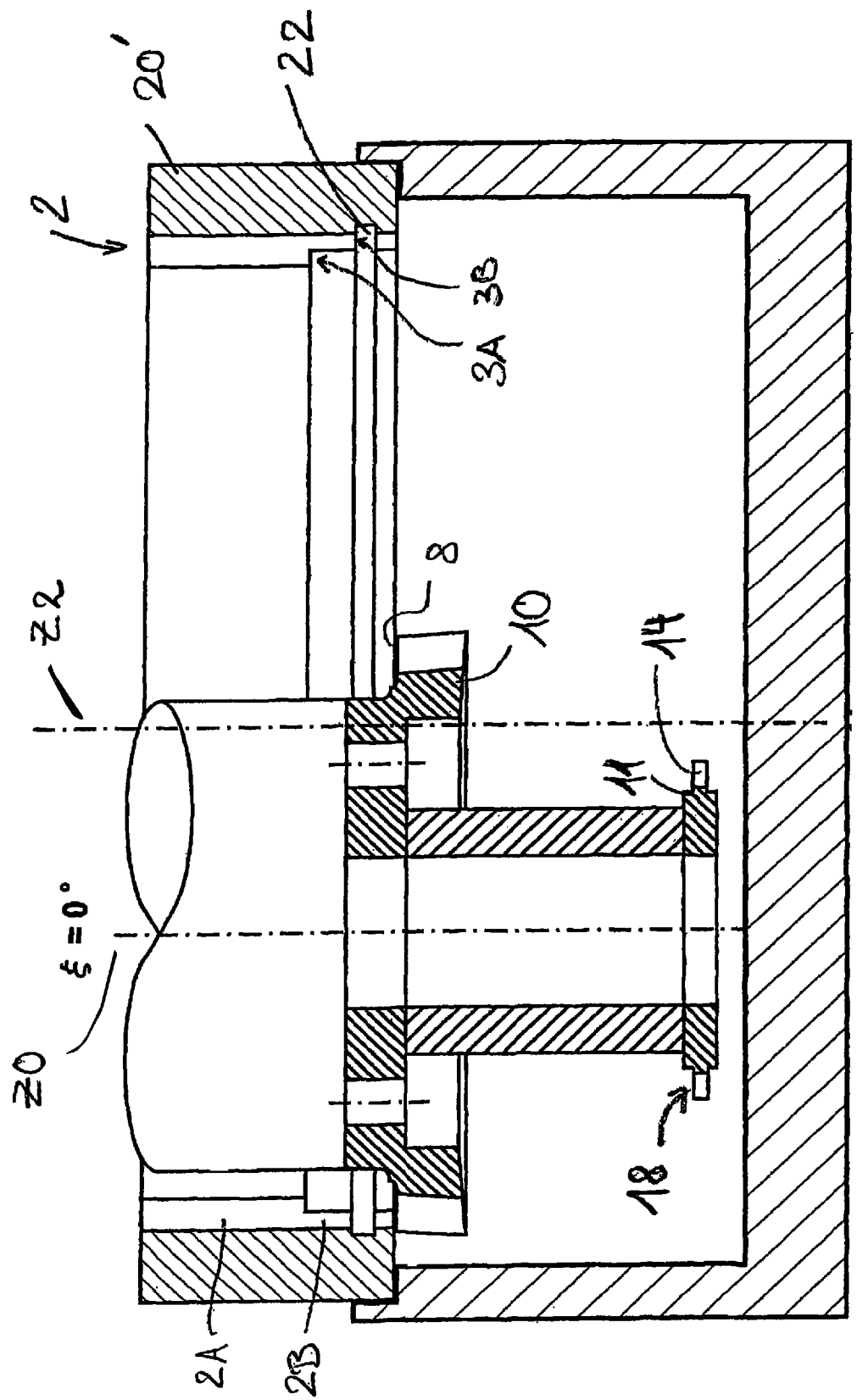

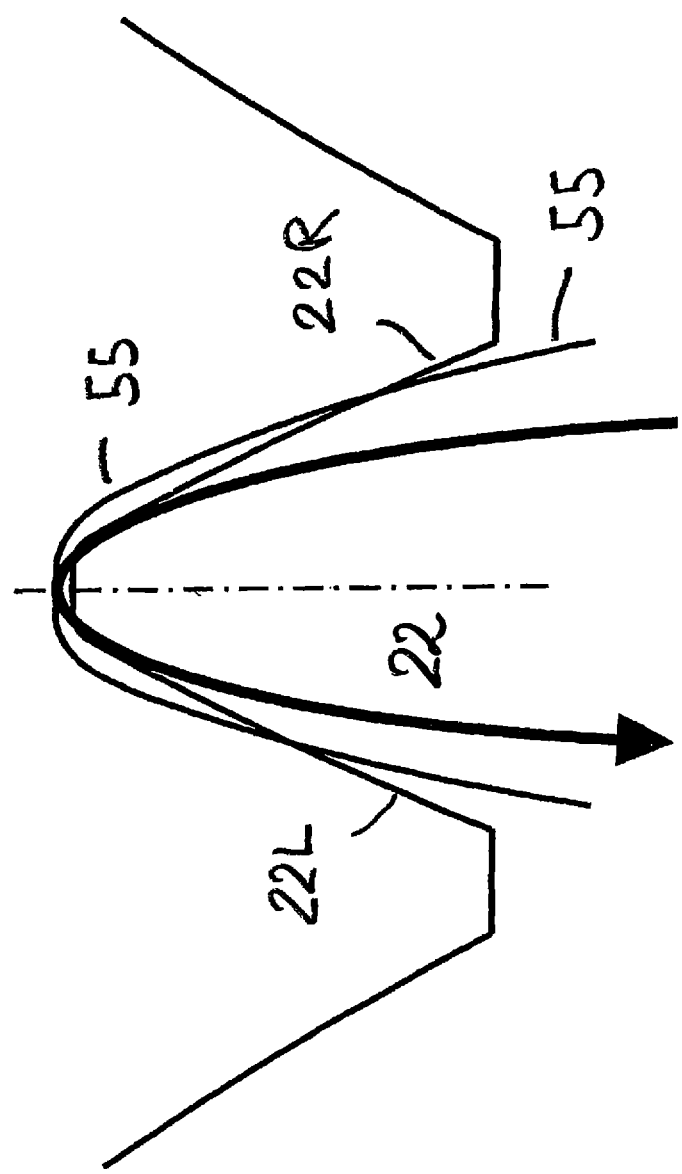

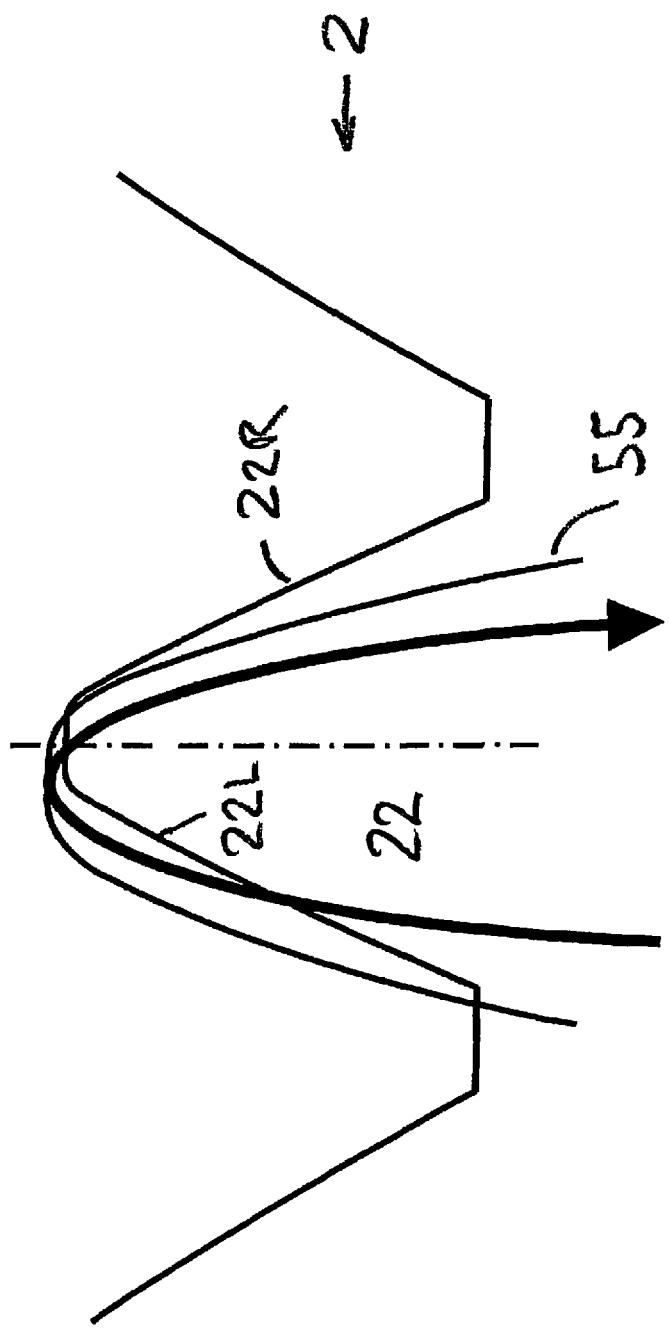

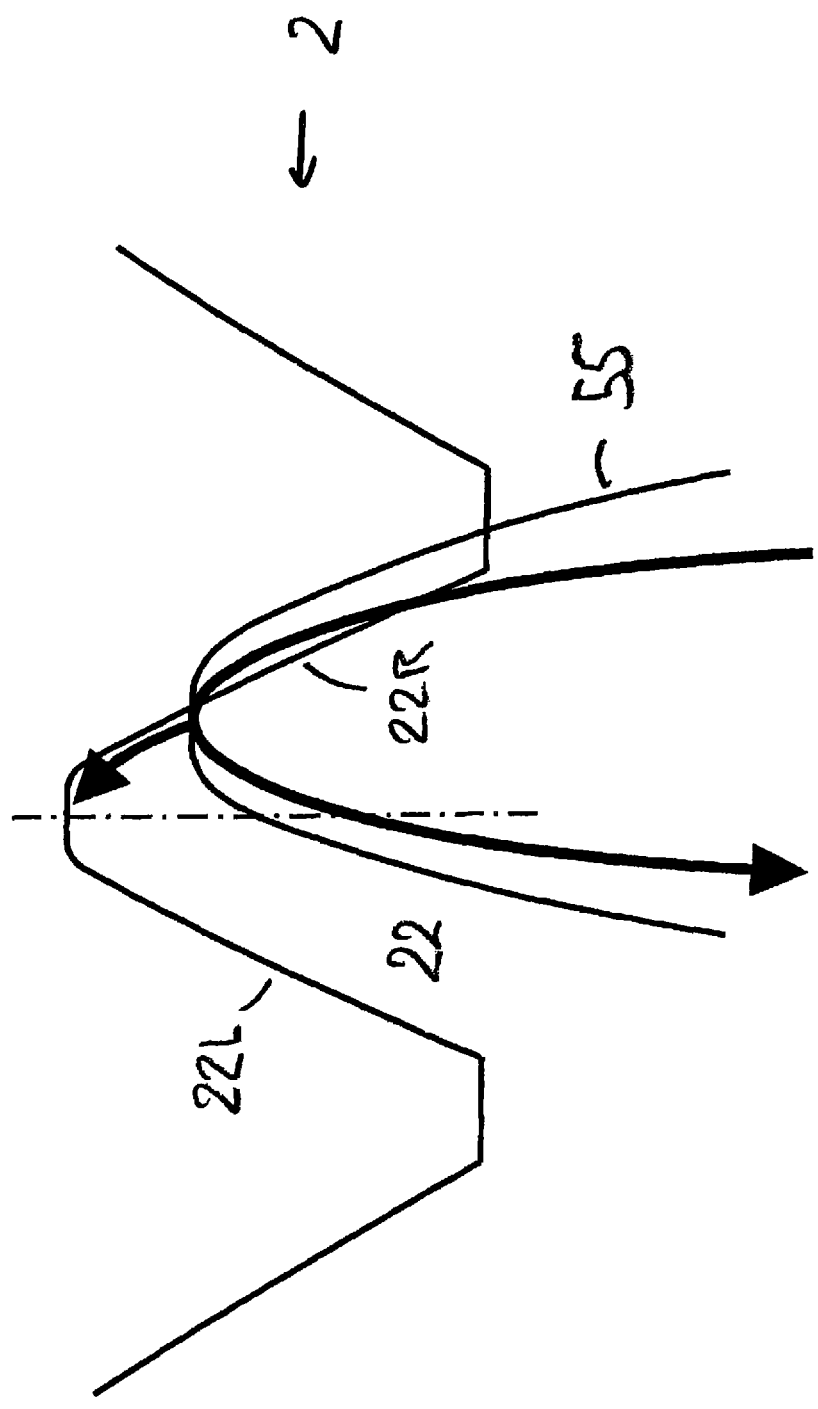

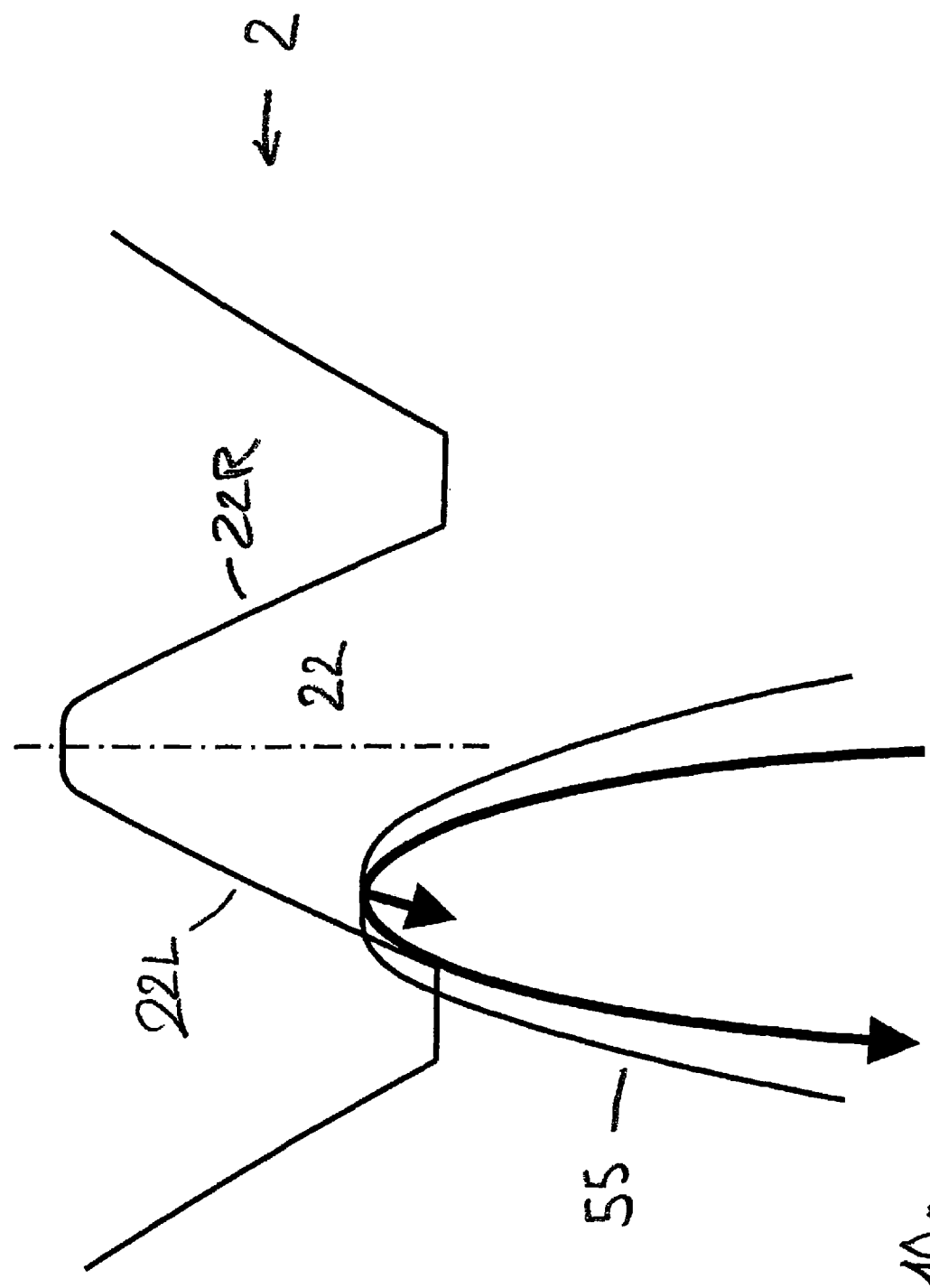

METHOD FOR MACHINING A WORKPIECE, TOOL ARRANGEMENT AND TOOTH CUTTING MACHINE

The invention relates to a method for machining a workpiece, wherein, in particular in the skiving process, a toothing is produced on the workpiece in a first machining operation, in which a toothed cutting wheel, which rotates about the axis of rotation thereof and, on a first end face, comprises cutting edges on the toothing thereof, is coupled in a rolling manner to the workpiece which rotates about the axis of rotation thereof, and a cutting movement of the cutting edges, which has directional components in parallel with the workpiece axis, ends at an axial side of the workpiece toothing, the cutting edges of the cutting wheel forming a first operating region which can be positioned with respect to the workpiece by means of movement axes, and in which, in a second machining operation using a second operating region, the workpiece is machined on the side of the workpiece toothing at which the movement ends, and to a tool arrangement and a toothing machine which are suitable for this purpose.

Such methods are known, for example by the skiving process, by means of which a toothing is produced in the first machining operation, and the deburring, in which the burrs produced on the end face of the workpiece toothing are removed in the second machining operation which is carried out on the end face. The skiving process itself is known to a person skilled in the art with regard to designing the skiving wheels with the cutting edges formed on one side and the associated kinematics with the axis-crossing angle between the axis of rotation of the tool and the axis of rotation of the workpiece; moreover, for further details of the skiving process, reference is made to EP 2 537 615 A1, to which reference is made with respect to the design of the skiving wheels and the machine axis kinematics of the method.

A method of the type mentioned at the outset is disclosed in DE 10 2007 015 357 A1, which describes the skiving for producing a toothing (first machining operation), and according to which deburring of the produced toothing is carried out using a deburring blade acting on the rear face of the produced toothing which comprises the burrs, which blade is shown in the first two drawings of DE 10 2007 015 357 A1 and bears the reference numeral 23 therein.

The problem addressed by the invention is that of improving a method of the type mentioned at the outset, in particular with regard to being able to achieve a higher machining quality in the second machining operation.

This problem is solved by a development of the method of the type mentioned at the outset, which is substantially characterised in that the second operating region can be positioned with respect to the workpiece by means of the same movement axes as the first operating region, and in particular is coupled for movement to the first operating region.

By means of the availability of the same movement axes for the positioning with respect to the workpiece, a similar relative positioning of the positional relationship of the second operating region to that of the first operating region is thus achieved using the same movement axes, by means of which a basis is in particular also formed for greater variability of the mutual relative positioning in the second machining operation, and reasonable machining results can be achieved in the second machining operation.

If the second operating region is coupled for movement to the first operating region for this purpose, it is additionally achieved that the second machining operation is carried out without changing the position and/or clamping of the machined workpiece, and also without needing to change tools. This results in an advantageous interaction between the two machining operations. In this case, the machining of the first machining operation does not necessarily have to be finished before that of the second machining operation, for example it is also conceivable to carry out "intermediate deburring" after a number of skiving passes. In principle, however, it would also be conceivable to make the same movement axes available to the second operating region by clamping a tool comprising the second operating region on a tool spindle instead of the cutting wheel. In a preferred variant of the method, it is not provided to change the location and/or clamping, but this could be carried out from other points of view, which will be described hereinafter.

The second operating region does not coincide with the first operating region, but a region other than the first operating region could by all means be a structure supporting the first operating region, as is likewise described with reference to the preferred embodiments which are described in the following. In the machining operation on the side at which the movement ends, the material protrusions which have been formed on this axial side by the production of the toothing, i.e. (primary) burrs, are removed by cutting off (shearing off). More preferably, plastic deformation of the tooth edges of the workpiece toothing into a chamfer does not take place either before or during the second machining operation, in particular there is no effect on the tooth edges of the produced toothing through which material is removed from the edge itself.

In addition, the term "workpiece toothing", comprising the side thereof at which the movement ends, is to be understood to mean that said side does not necessarily have to be the axial end face of an "overall toothing". In fact, an "overall toothing" of this type, for example an internal toothing, could have a transition from a higher to a lower toothing, and there could likewise be an axial side at the transition, at which side the movement ends in part. The same applies in the case of a groove interrupting the toothing. In this case as well, there is a toothing (toothing region) comprising a side at which the movement ends, on which burrs are formed during the production of the toothing.

While the method is preferably used for internally toothed workpieces, externally toothed workpieces can also be machined thereby. In addition, the first machining operation can also be carried out in the skiving process.

In a particularly preferred embodiment, the second operating region can be rotated about an axis of rotation which, in the second machining operation, extends coaxially with a tool spindle axis which extends coaxially with the axis of rotation of the cutting wheel in the first machining operation. In particular, the first and the second operating regions can be rotationally coupled by means of the same axis of rotation. In this way, the second operating region can also undergo a rotational movement, as a result of which a better machining result of the second machining operation can be achieved. Burrs can thus be reliably removed. A compact machine configuration is also possible, which outputs workpieces which have already been deburred.

In another particularly preferred embodiment, the second operating region is formed by a toothing, in particular by an end face of a toothing. This makes it possible to machine individual regions on the end face of the workpiece toothing to be machined in a controlled manner in the second machining operation. In addition, fewer collision problems with a clamping device of the toothing to be machined have to be taken into consideration. Preferably, when coupled for movement, the second operating region on a deburring tool can be in the form of a disc, but also of a deburring blade, a deburring pin or a deburring arrangement comprising such elements. In particular in the case of burrs having relatively low adhesion, it is also possible to deburr in the case of a non-rotating deburring tool, using positioning axes which are available for the first operating region.

In this case, it can be provided that the second operating region is located behind the first operating region with respect to the cutting movement directional component, which is in parallel with the workpiece axis, of the first machining operation. In the case of operating regions which are coupled for movement and, if the side of the workpiece toothing at which the movement ends is the side which faces the workpiece toothing clamping, the first operating region would correspondingly be positioned closer to the workpiece clamping, and a corresponding space would have to be kept free.

In one possible embodiment, the second operating region is formed close to the second end face of the cutting wheel, in particular on said second end face by means of the cutting wheel toothing. In this case, a particularly simple implementation of a tool arrangement which is suitable for the method in the form of a cutting wheel is successful, the front side of which, with the cutting edges provided thereon, is used to produce the toothing (first operating region and first machining operation) and the rear side of which (second operating region) machines the side of the workpiece toothing at which the movement ends in the second machining operation.

It is likewise conceivable for the second operating region to be formed on a second cutting wheel, which in particular is rigidly connected to the cutting wheel of the first machining operation, and the dimension of which in the direction of the cutting axis is in particular less than that of the first cutting wheel, preferably by at least 20%, in particular by at least 40%. A tool which is suitable for this purpose could be designed for example as a tandem tool, i.e. a tool arrangement which supports the two tools and can be clamped on a tool spindle. This variant offers the advantage of not being bound to the toothing geometry of the (first) cutting wheel for the production of the toothing. However, it is preferred for the second cutting wheel to likewise be toothed, preferably with a similar modulus to, in particular the same modulus as the first cutting wheel. The term "second cutting wheel" is to be understood in this case to mean that there is a wheel-like form, and that said form is suitable for shearing off burrs, while the second cutting wheel does not require cutting edges to produce a toothing.

The second wheel can have a smaller axial dimension in particular when machining is to be carried out on a side at which the movement ends, which side is created by a groove or a transition between a higher and lower toothing. In particular, it can be provided that the axial dimension of the second wheel is designed to be small enough to penetrate into a groove.

Indeed, it is also provided to combine the two above-mentioned advantages. Thus, the rear side of the first cutting wheel could be provided with the second operating region, and another wheel-shaped tool which is in particular coupled for movement could be provided, the axial dimension of which turns out to be smaller than that of the first cutting wheel by at least 20%, in particular at least 40%, or indeed even 50% or more, and which cutting wheel forms a(n additional second or) third operating region on an end face, by means of which region in particular burrs which are formed on grooves or transitions in the toothing height on the workpiece can be removed.

In one expedient embodiment of the method, it is provided that an external diameter of the second operating region, in particular the tip circle of a toothing of the second operating region is made to overlap with the root circle of the workpiece toothing in the second machining operation. In this way, burrs can be removed in a reliable manner even in the root region of the workpiece toothing.

Furthermore, in a particularly preferred embodiment, it is provided that, in the second machining operation, when viewed in projection onto a plane which is orthogonal to the workpiece axis, a flank region of the workpiece toothing is made to overlap with a toothing flank region of the second operating region. In particular, in this respect, it is provided that the toothing of the second operating region rotates in rolling coupling for the rotation of the workpiece axis, and the flank region of the workpiece toothing is made to overlap with an envelope of rolling positions of a tooth of the second operating region.

As already described above, burrs which are formed in the second machining operation as a result of the production of the workpiece toothing on the side thereof at which the movement ends are to be removed by shearing off. In this context, in a particularly preferred embodiment, it is provided that the burrs are sheared off by means of a shearing movement. The shearing movement is the relative movement between the tool and the workpiece which removes burrs. Preferably, for at least 50%, preferably at least 70%, in particular at least 90% of the shear-off points of the workpiece region of each workpiece flank side which is machined in the machining operation, the inner product from the direction vector of the shearing movement at the shear-off point, which vector is projected into the plane which is perpendicular to the workpiece axis and standardised therein to the length one, and from the normal vector which is projected into the plane which is perpendicular to the workpiece axis and standardised therein to the length one and is located on the workpiece flank at the shear-off point and points towards the gap, is not greater than 0.5, preferably not greater than 0.3, more preferably not greater than 0.1, in particular not greater than 0, and the shearing movement is thus preferably directed away from a gap in the workpiece toothing, on one and in particular also the other of the tooth flanks defining the gap and including the tooth root regions thereof. Otherwise, there would be a risk of a burr not being reliably sheared off, but rather folding down into the gap in the toothing and being able to remain there, which can lead to problems in the continued use of the toothing. There is such a risk for example in the case of a workpiece which is moved past a fixed deburring tool on at least one flank side. By means of this preferred embodiment of the invention, elaborate downstream compensation measures can thus be avoided.

In another embodiment, it is provided that, in the second machining operation, machining is carried out on the side of the left and right toothing flanks one after the other, wherein the order does not matter. This makes it possible to carry out a more controlled machining of the lower face of the workpiece toothing on each flank side and accordingly to carry out a coordinated adjustment of the directional components of a shear-off movement.

Furthermore, in one embodiment of the method, in the second machining operation, between the machining on the left and right flanks, the direction of rotation of the workpiece rotation is reversed, in particular also a direction of rotation of a rotation of the second operating region. This also makes it possible to customise a shearing direction of the shear-off movement carried out in the deburring process for each flank.

In a variant of the method which is considered to be advantageous, the second operating region is initially positioned behind the side of the workpiece toothing at which the movement ends, with respect to the cutting movement component which is in parallel with the workpiece axis, then the distance thereof from the workpiece axis is changed, and the second operating region is moved against the cutting movement component which is in parallel with the workpiece axis for the second machining operation. The change in the centre distance relative to the workpiece axis is an enlargement when the toothing produced is an internal toothing, and a reduction when it is an external toothing. If, for illustrative purposes, a vertical workpiece axis and a downwardly directed tool movement are assumed for the production of the toothing, in this variant of the method, the second operating region is initially dipped under the toothing lower face to be machined, preferably until a tip circle of the second machining region at least reaches and preferably goes beyond the root circle of the produced toothing, which corresponds to an infeed with a radial component, and moves the second operating region upwards in an axial feed motion, until contact is established with the burrs, and the burrs are sheared off the lower face of the toothing. In this case, it is not necessary to reach precisely the level of the lower face of the toothing (with surface contact), a minimal distance between the surfaces which face one another in the second machining operation which is sufficient for shearing off the burrs can remain.

In a particularly preferred embodiment of the method, the axis of rotation of the workpiece and an axis of rotation of the second operating region are driven at a predetermined speed ratio, in particular in inverse ratio to the associated number of teeth, $(|n_2/n_0|=|z_0/z_2|)$, i.e. under rolling coupling conditions, for the second machining operation. In this way, it is achieved that, when viewed in a projection which is orthogonal to the workpiece axis, from the perspective of a moved gap of the produced toothing, a region of the toothing profile can be made to overlap with an envelope of rolling positions of a tooth of the second operating region. In a workpiece revolution, deburring can be carried out in this overlapping region; it is conceivable to carry out a plurality of revolutions in order to achieve an improved deburring result in this region.

Such machining is also disclosed by the invention as being self-contained, i.e. as being independent of the type of the production of the toothing and the availability of the same axes during the deburring and/or the coupling to the tool producing the toothing as a self-contained method which is worth protecting.

The invention thus likewise relates to a method for machining an end face of a workpiece toothing in which the workpiece toothing rotates about the workpiece axis thereof, and a toothing on the tool side is brought into machining engagement with an end face which faces the end face to be machined, which toothing rotates in rolling coupling for the rotation of the workpiece axis about the tool axis thereof, so that material protrusions on the end face to be machined are sheared off.

The machining operation of this independent embodiment of the method, with respect to the previous description, corresponds to the second machining operation which is used to remove burrs with preferably no effect on the shape of the tooth edges. In this respect, the features, settings and method embodiments shown above and below with respect to the second machining operation also apply to this independently disclosed embodiment of the method and can be combined therewith or transferred thereto.

In this context, it can be provided for example that, for the second machining operation, in order to produce an overlap and/or change the overlapping region, an additional rotation of the workpiece and/or tool is carried out. An additional rotation of this type ultimately has the same effect as a mutual shift of the workpiece and the tool in the tangential direction. Furthermore, in a particularly preferred embodiment of the method, it is provided that, in the second machining operation, a relative movement is carried out with a directional component extending radially relative to the workpiece axis. A feed motion with a radial component is thus carried out, preferably towards the tooth root of the machined toothing.

In another preferred embodiment of the method, it is provided that, in the second machining operation, a mutual change in position between the workpiece and a/the envelope of rolling positions of a tooth of the second operating region is carried out, in particular, the envelope is moved along a path having tangential and radial components. In other words, when viewed in projection onto a normal plane relative to the workpiece axis, the envelope of the rolling positions of a tooth of the second operating region, which is viewed from the perspective of a gap in the toothing which is to be machined on the side thereof at which the movement ends, can be shifted in such a way that it for example leaves the profile of the tooth gap, i.e. successively overlaps the tooth flanks and the root region of the gap. As will be described hereinafter with reference to the description of the drawings, there are also diverse variants with respect to the type of an adjustable movement path, which is passed through in portions either with or without reversing the direction of the basic movements.

In particular in the context of the desired shear-off movement during the deburring away from the gap, it is preferable for the peripheral speed of the workpiece in the region which is currently being deburred and which can change in the case of a radial infeed to be approximately equal to the peripheral speed of the deburring edge on the tool side. In this context, with this objective, the rotational speeds $n_2$ and $n_0$ can be adapted during the in particular radial feed motion. In the case of symmetrical gap geometries of the produced toothings, approximately radial relative movement components of the currently acting deburring edges of the tool are thus successful. In the case of asymmetrical gap geometries, in order to achieve the same objective, the rotational speeds could be adapted in a corresponding manner.

The above-described avoidance of the burrs folding down into the toothing is also disclosed by further aspects of the teaching of the invention as being possible to achieve independently, i.e. independently of the type of the production of the toothing and the availability of the same axes during the deburring and/or the coupling to the tool producing the toothing, and in particular also independently of the shape of the tool for the second machining operation.

As a self-contained method which is worth protecting, the invention thus likewise relates to a method for machining an end face of a workpiece toothing, in which the workpiece toothing rotates about the workpiece axis thereof, and a deburring tool rotating about the tool axis thereof is brought into machining engagement with an operating region which faces the end face to be machined, so that material protrusions on the end face to be machined are sheared off in a shearing movement, wherein, for at least 50%, preferably at least 70%, in particular at least 90% of the shear-off points of the workpiece region of each workpiece flank side which is machined in the machining operation, the inner product from the direction vector of the shearing movement at the shear-off point which is projected into the plane which is perpendicular to the workpiece axis and standardised therein to the length one, and from the normal vector which is projected into the plane which is perpendicular to the workpiece axis and standardised therein to the length one and is located on the workpiece flank at the shear-off point and points towards the gap, is not greater than 0.5, preferably not greater than 0.3, more preferably not greater than 0.1, in particular not greater than 0. The machining operation of this independent embodiment of the method, with respect to the previous description, corresponds to the second machining operation which is used to remove burrs with preferably no effect on the shape of the tooth edges. In particular for this embodiment of the method, it is preferable, for this purpose, to coordinate with one another the respective peripheral speeds of the workpiece and the tool in the region currently being deburred, in particular in the form of substantially equal peripheral speeds. For this purpose, the deburring tool can be a toothed tool, but also for example a deburring disc or one or more rotating deburring blades.

In a particularly preferred embodiment of the method, the movement axes (for positioning the first operating region) comprise a first linear movement axis having a directional component in parallel with the workpiece axis, and a second linear movement axis having a directional component which is orthogonal to the first linear movement axis, and in particular a third linear movement axis having a directional component which is orthogonal to the plane spanned by the first and second linear movement axes.

In a particularly expedient embodiment, the first linear movement axis can extend in parallel with the workpiece axis, and the second linear movement axis can extend orthogonally thereto. It is preferable for the first and second linear movement axes to belong to the same movement axes by means of which the second operating region can be positioned with respect to the workpiece.

In a more preferred embodiment of the method, the movement axes (by means of which the first operating region can be positioned) have a rotational axis for setting an axis-crossing angle between the workpiece axis and the cutting wheel axis. In particular in this case, the axis-crossing angle can be left the same for the first and second machining operations, as a result of which the rotational machine axis is relieved. This rotational axis is required when the toothing is produced on the workpiece by means of the skiving process. However, the production of the toothing on the workpiece could also be produced for example by means of gear shaping; in this case, the rotational axis would not be required. With respect to the same movement axes which are available to the second operating region, it is provided that the rotational axis and the third linear movement axis, if available for the positioning of the first operating region, do not have to belong to the available same movement axes for the second operating region, but it may be preferable, in particular in the case of the first and second operating regions being coupled for movement and/or rotation.

Furthermore, in a particularly preferred embodiment of the method, it is provided that an orientation of a tool-side end face, which faces the end face of the workpiece toothing on the side at which the movement ends in the second machining operation, is adapted to the orientation of the workpiece end face, in particular by means of tool shaping which is adapted to the machine axis settings in the second machining operation and/or by means of settings of the machine axes which are adapted to the shape of the tool in the second machining operation. The "and" variant of this "and/or" combination is to be understood in this case to mean that, in the second machining operation, the tool shaping and machine axis settings are coordinated with one another in such a way that the orientation of the faces facing one another is adapted in a corresponding manner, i.e. said faces are oriented in particular in parallel with one another, in order to avoid undesirable collisions between the tool and the workpiece and in particular to avoid machining into the tooth flanks.

In an expedient embodiment, it can also be provided that contacting in the second machining operation is detected using sensors. This could take place for example by means of an acoustic sensor which detects noise emissions, or by detecting the power consumption incurred on infeed axes or axes of rotation, or by analysing the vibration behaviour of the machine. For example when the second operating region is moved axially closer to the toothing end face to be machined, an additional axial feed motion can then be stopped in a timely manner.

With respect to suitable tools for carrying out a method according to one or more of the above-described aspects, the invention also relates to a tool arrangement for carrying out the second machining operation of a method according to any of the previously mentioned aspects, using the second operating region, which is preferably formed by a toothing, the tool arrangement comprising in particular the cutting wheel having the first operating region.

The advantages of the tool arrangement according to the invention result from the advantages of the above-described embodiments of the method. In this context, it can be provided that the second operating region is formed by the cutting wheel toothing on the second end face thereof. In this case, the tool arrangement can be formed as an individual tool (comprising two different operating regions).

Alternatively (or additionally), it can be provided that the second (a third) operating region is formed on a second tool, in particular a toothed cutting wheel, which is at an axial distance from the cutting wheel comprising the first operating region.

It is understood that, when using machine technology, the geometric configuration of the overall apparatus, for example consisting of retaining elements, tools, workpiece, clamping means and machine elements, is to be checked to ensure that undesirable collisions between the workpiece and the tool or other elements of the machine do not occur either in the first or in the second machining operation. However, this is to be carried out by simple means, by suitably selecting the positioning of the tools on the retaining element, the diameter of said tools, and distances to be maintained of the first and second operating regions.

With respect to the above-mentioned suitability for deburring on grooves which interrupt toothings, the invention likewise discloses, in particular as being independently worth protecting, a tool arrangement comprising a cutting wheel having cutting edges on the toothing thereof on a first end face, by means of which a toothing can be produced on a workpiece in particular in the skiving process, and a deburring tool which is coupled to the cutting wheel in a rigid manner and so as to be able to rotate about the same axis of rotation, said tool being in particular in the form of a toothing, the axial dimension of which is smaller than that of the cutting wheel by at least 20%, preferably at least 40%, in particular at least 60%, in order to remove material protrusions (simply to deburr) axial side regions of the workpiece toothing.

In a preferred embodiment, it can be provided that the second operating region is ground. Furthermore, the second operating region can be coated, in particular can be ground before coating. These measures can have positive effects with respect to decreasing wear of the deburring tool.

Lastly, with respect to machine technology, the invention also protects a machine tool, in particular a skiving machine, comprising at least one workpiece spindle for receiving a workpiece and at least one tool spindle for receiving a tool, and a control unit, which is substantially characterised in that the control unit is equipped with a control program which controls the machine tool in order to carry out a method according to any of the above-mentioned aspects of the method on a workpiece which is received on at least one of the at least one workpiece spindle, using at least one tool which is received on at least one of the at least one tool spindle. The machine can also be in the form of a gear-shaping machine.

In a preferred embodiment, the machine tool can comprise precisely one tool spindle and precisely one workpiece spindle, so that the method can optionally be carried out with a tool changeover using a machine having a simple construction. In the machine tool, a tool spindle can be provided for the tool comprising the first operating region, and a second tool spindle can be provided for the (deburring) tool comprising the second operating region, for the machining operations on the workpiece which is clamped on a workpiece spindle. In addition, machine tool variants are also conceivable in which a location of the first machining operation and a location of the second machining operation differ from one another to such an extent that it is necessary to reposition the workpiece, using a positioning means which takes a clamped workpiece from the location of the first machining operation to the location of the second machining operation, in particular without changing the clamping thereof, for example by means of a rotational movement or also by means of a linear movement, which can be implemented for example in pick-up machines, in which a suspended workpiece spindle moves linearly on the stand, and the tool spindles are arranged at the bottom. The machine tool of this type is thus configured to machine, in parallel, a workpiece at one location in the first machining operation, and another workpiece at another location in the second machining operation. In a particularly preferred embodiment, by means of this positioning, an in particular diametrically opposed second clamping is achieved at the location for the first machining operation. Such a machine comprises at least two workpiece spindles, which are moved along for example in the positioning movement of the clampings or are decoupled before the positioning movement and coupled thereafter. However, the change in position could also take place by means of a loading/unloading system, in the case of stationary spindles and clampings.

As machine axes in particular of the tool at the location (locations) of the first/second machining operation, the above-described first, second and third linear movement axes and rotational axes can be used, in addition to the axes of rotation of the respective spindles themselves. As is conventional, said movement axes having respective drives, for example in the form of servo drives, in particular direct drives, can be actuated in a CNC-controlled manner using the control unit.

Figure 4:
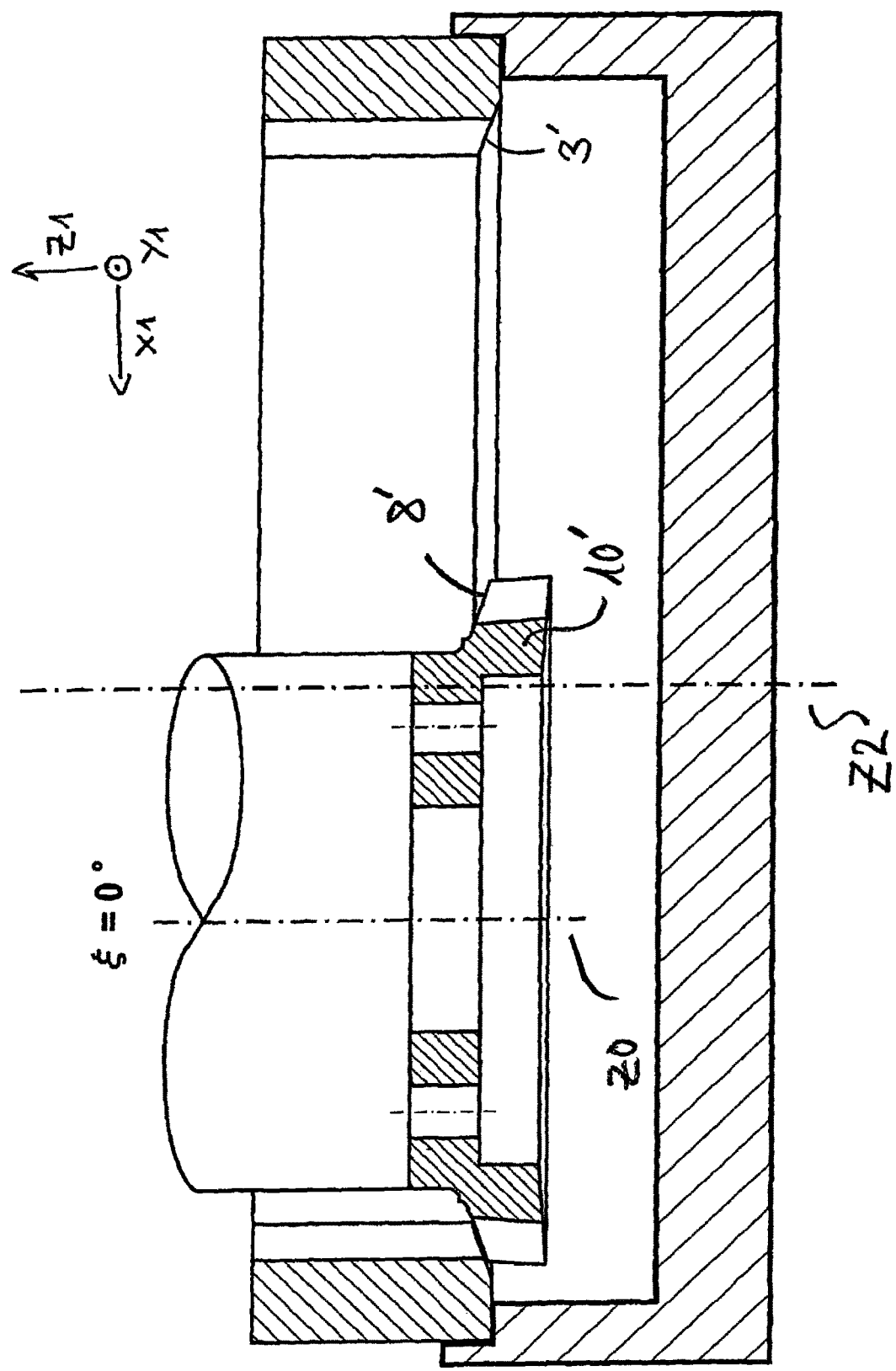
Figure 5:
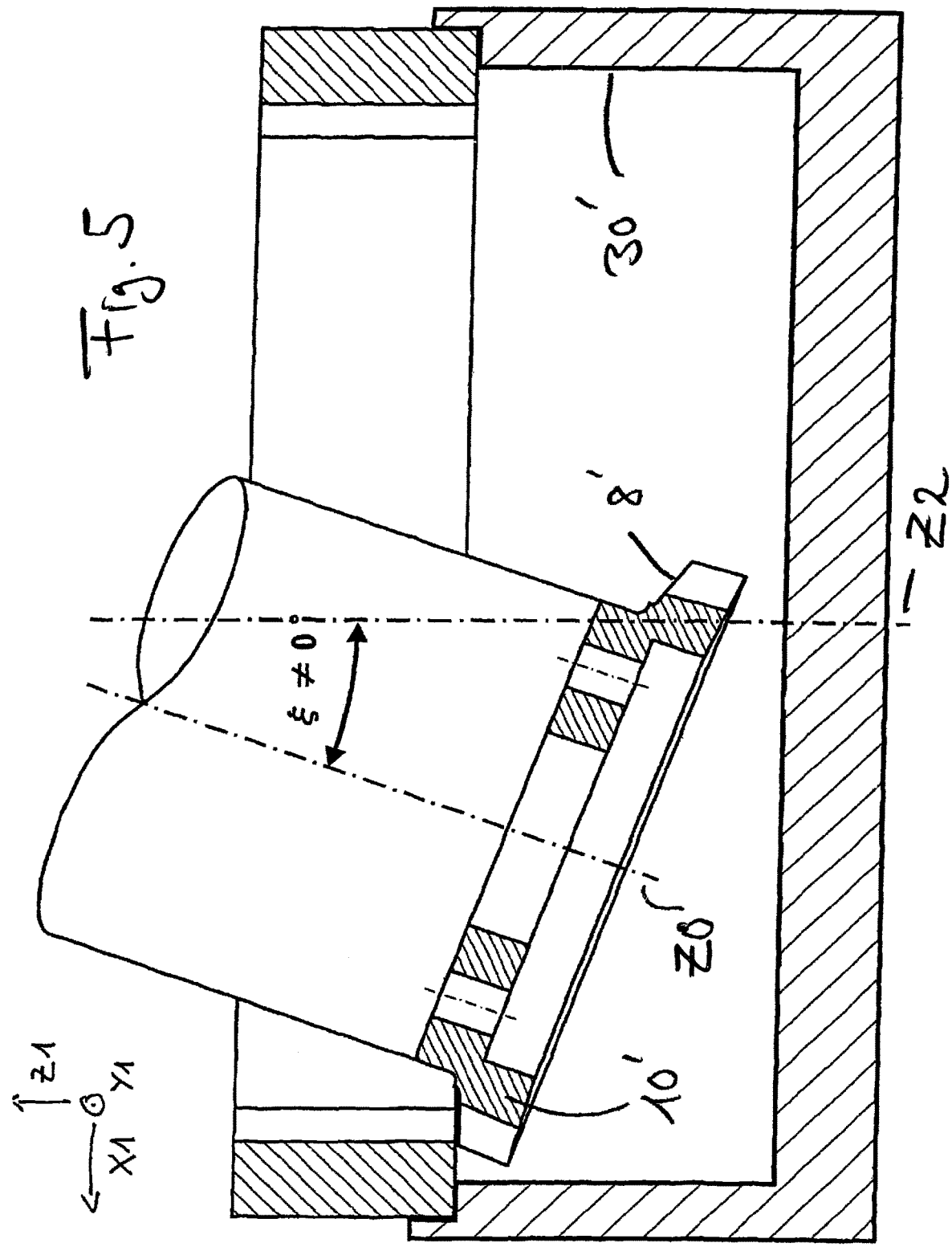
Figure 6:
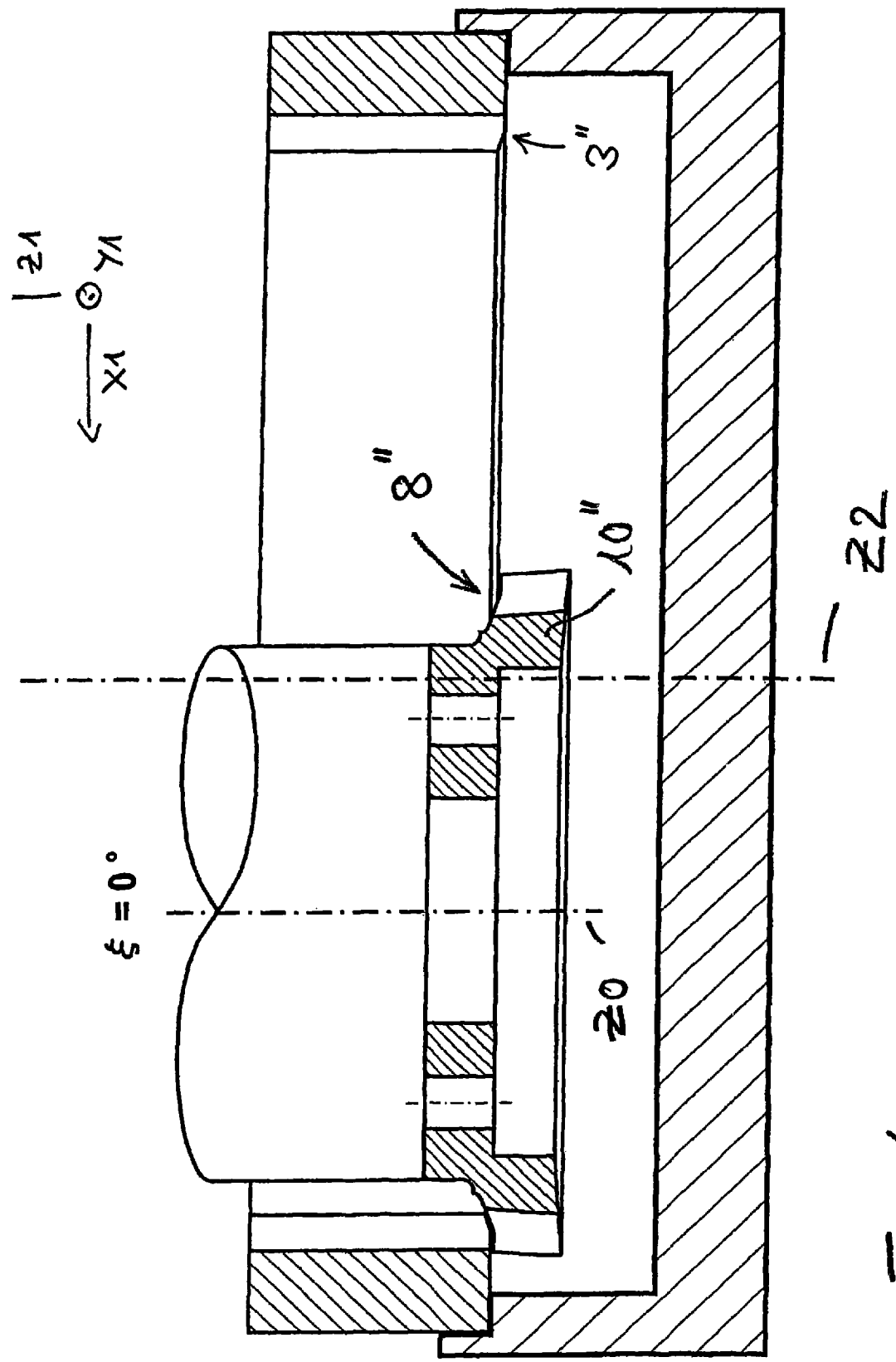
Figure 7B:
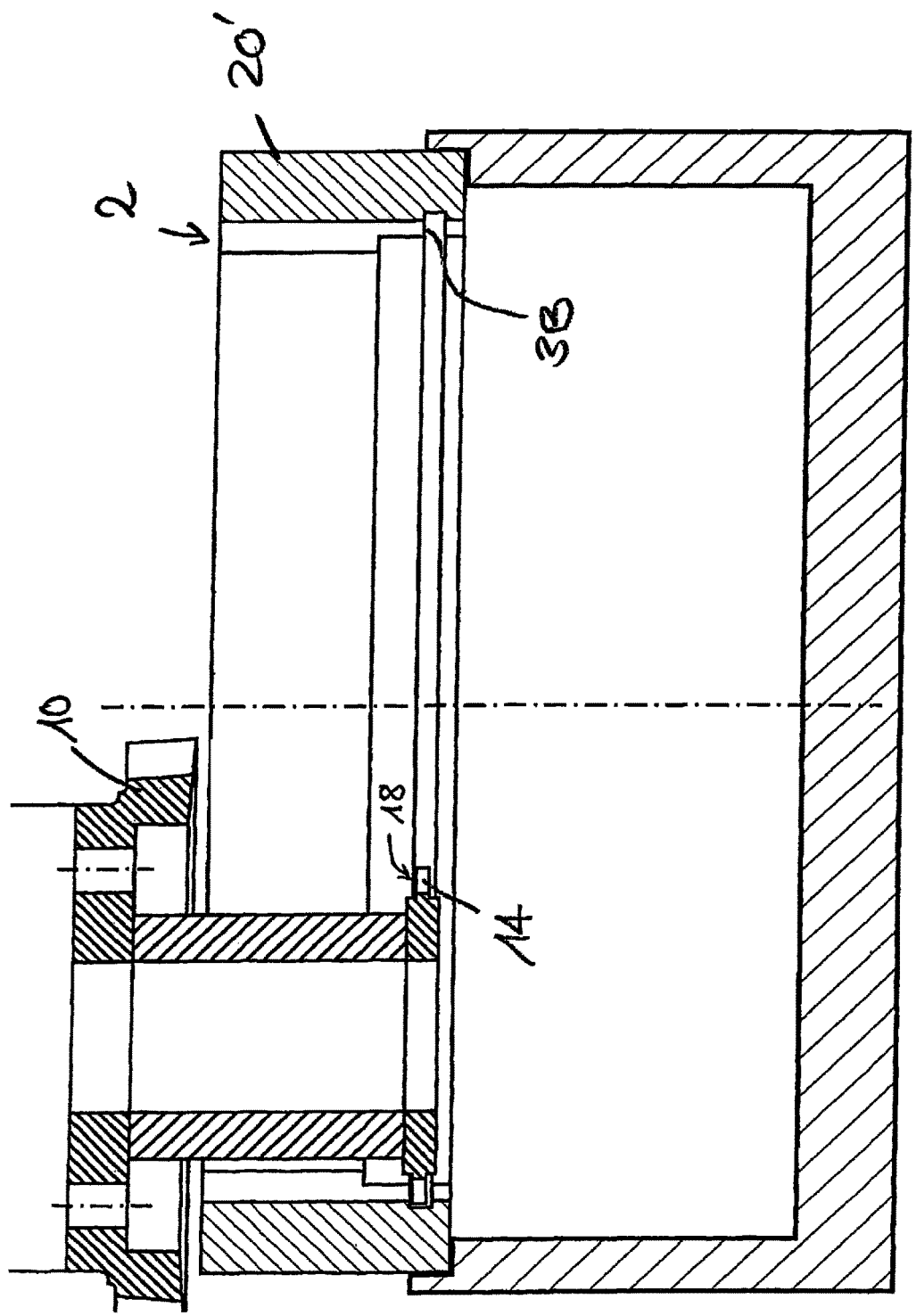
Figure 7C:
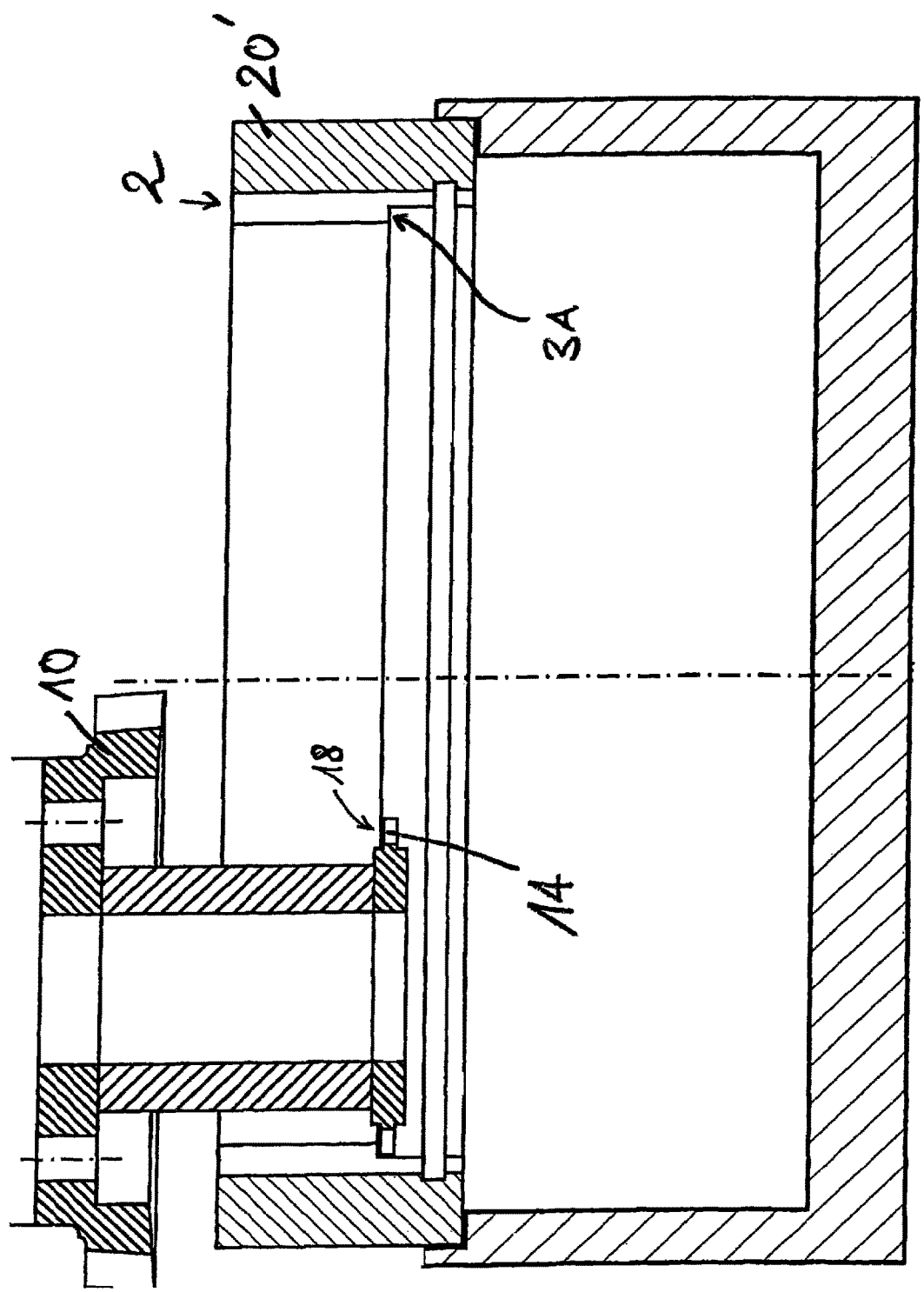
Figure 8A:
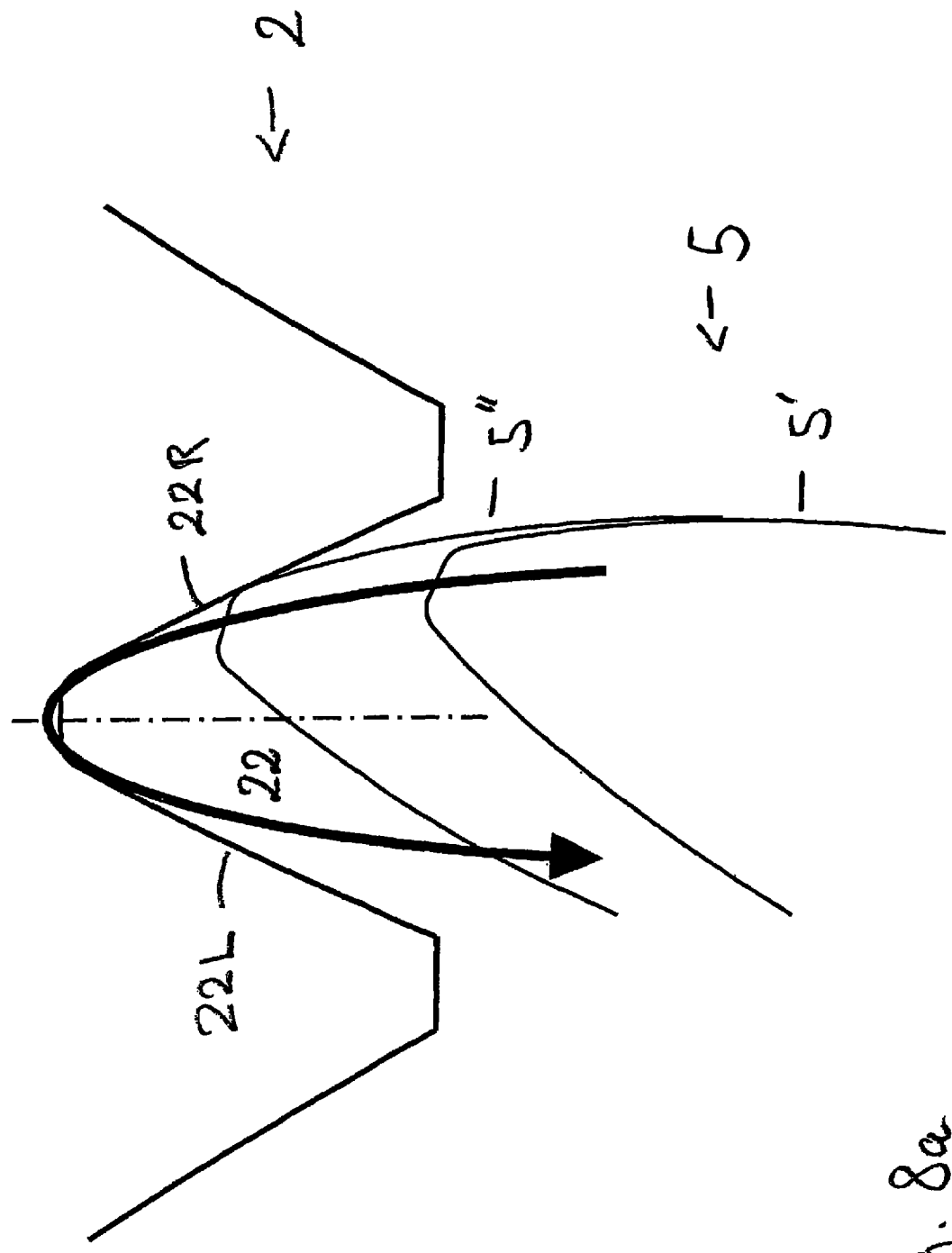
Figure 8B:
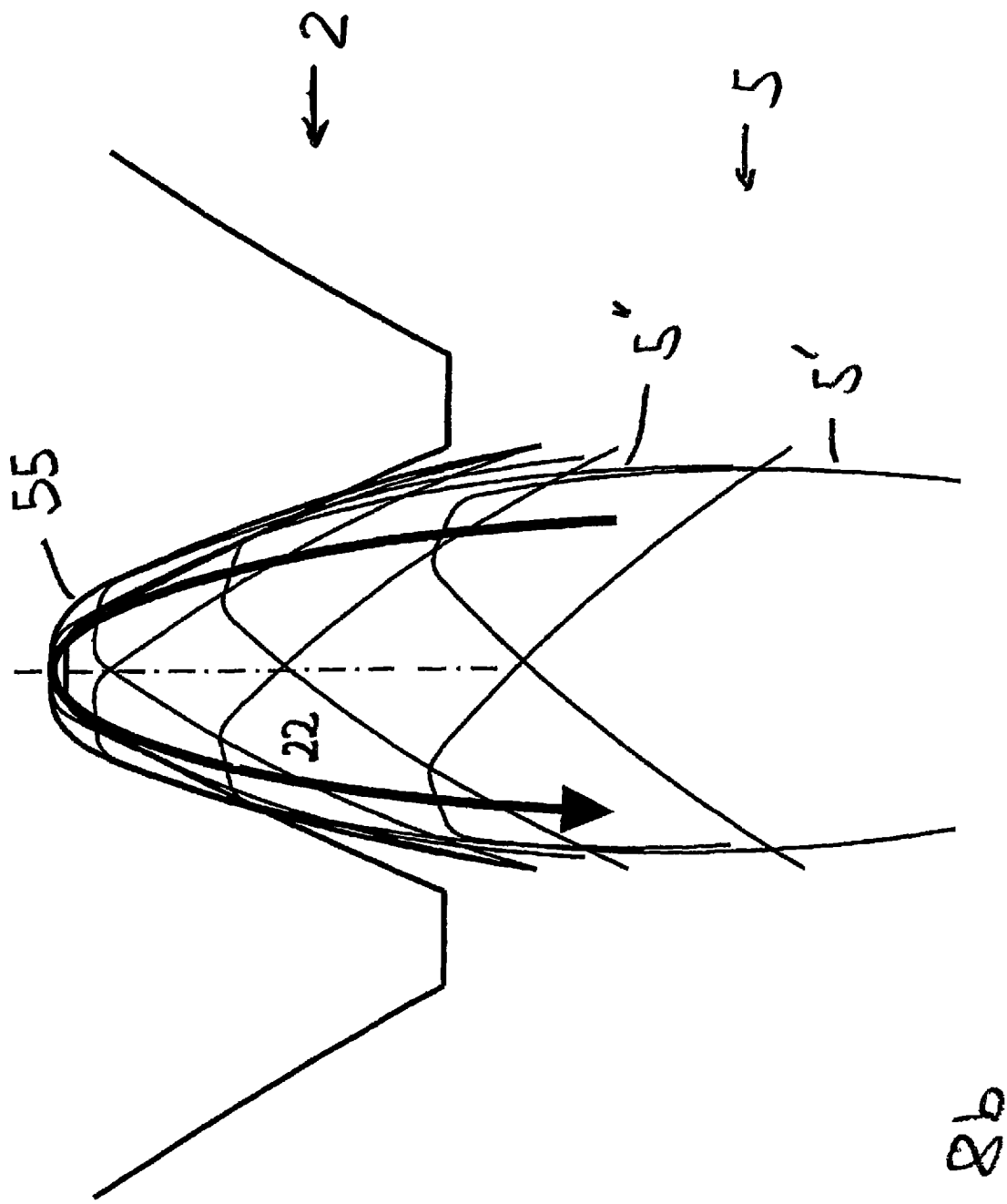
Figure 9A:
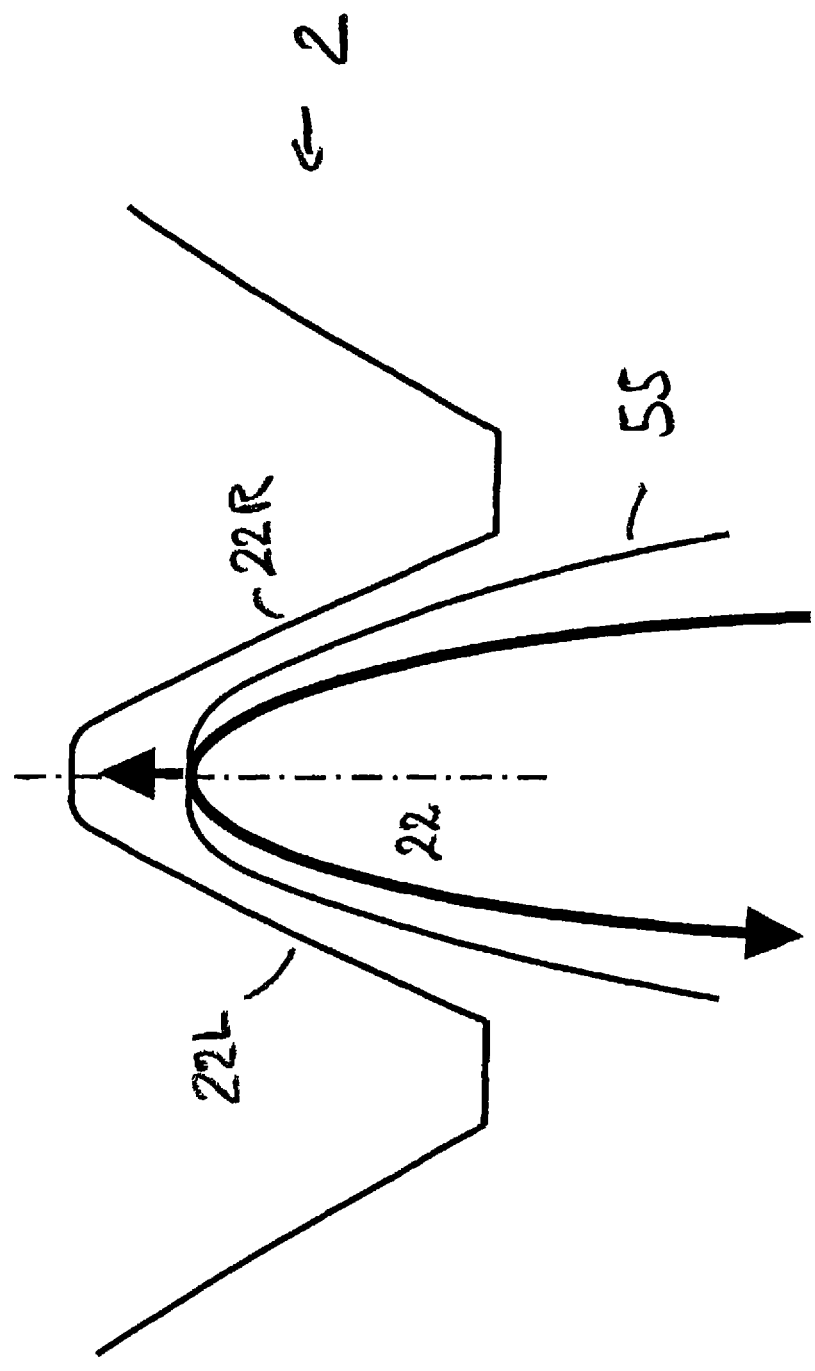
Figure 9B:
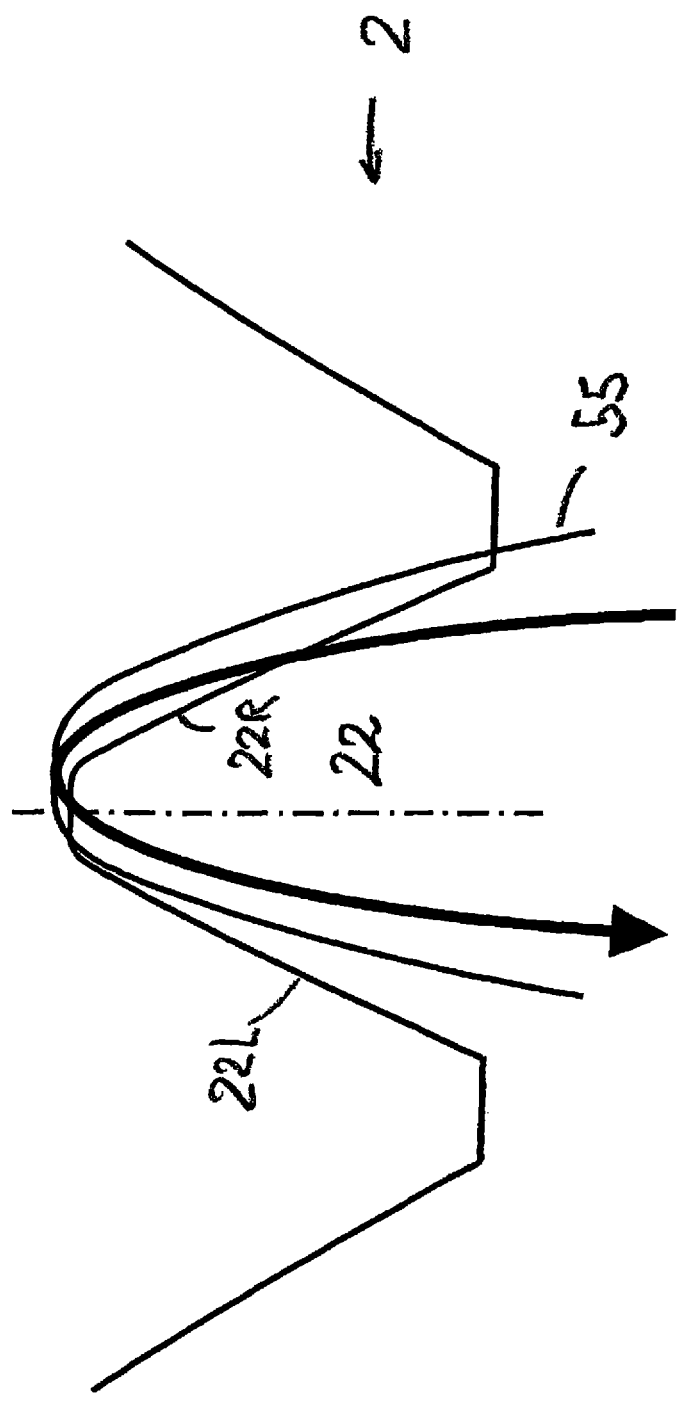
Figure 10A:
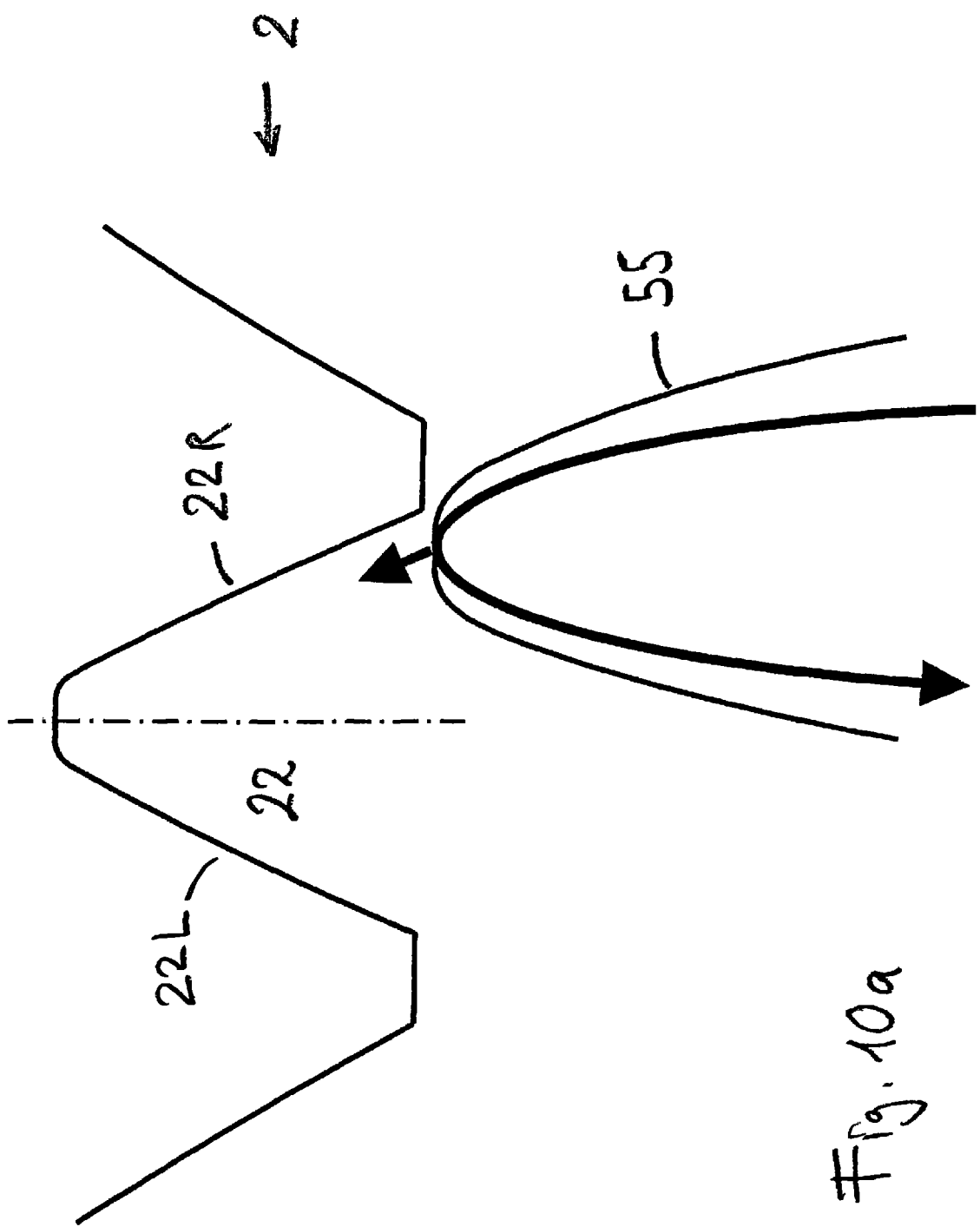
Figure 11:
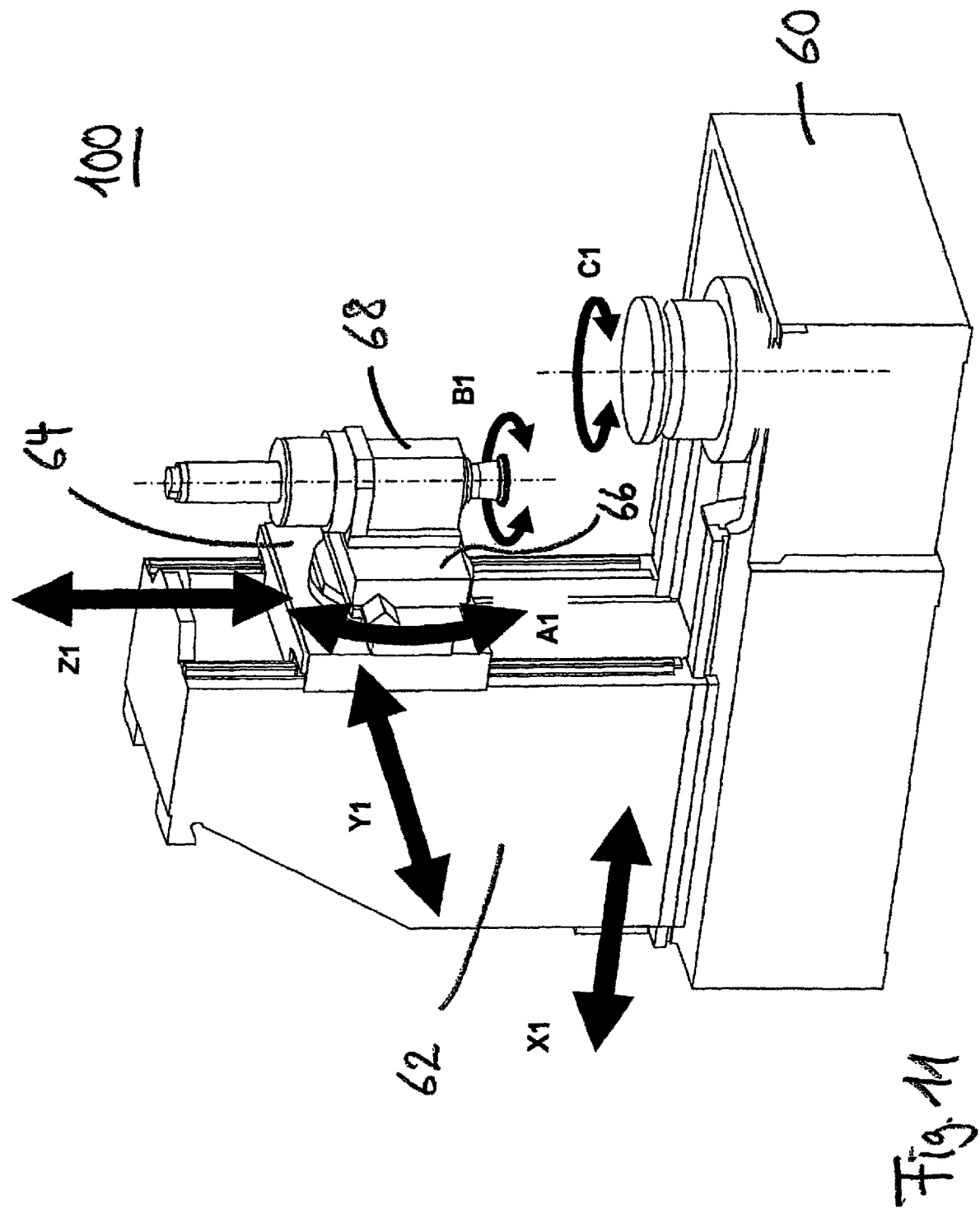
Figure 12:
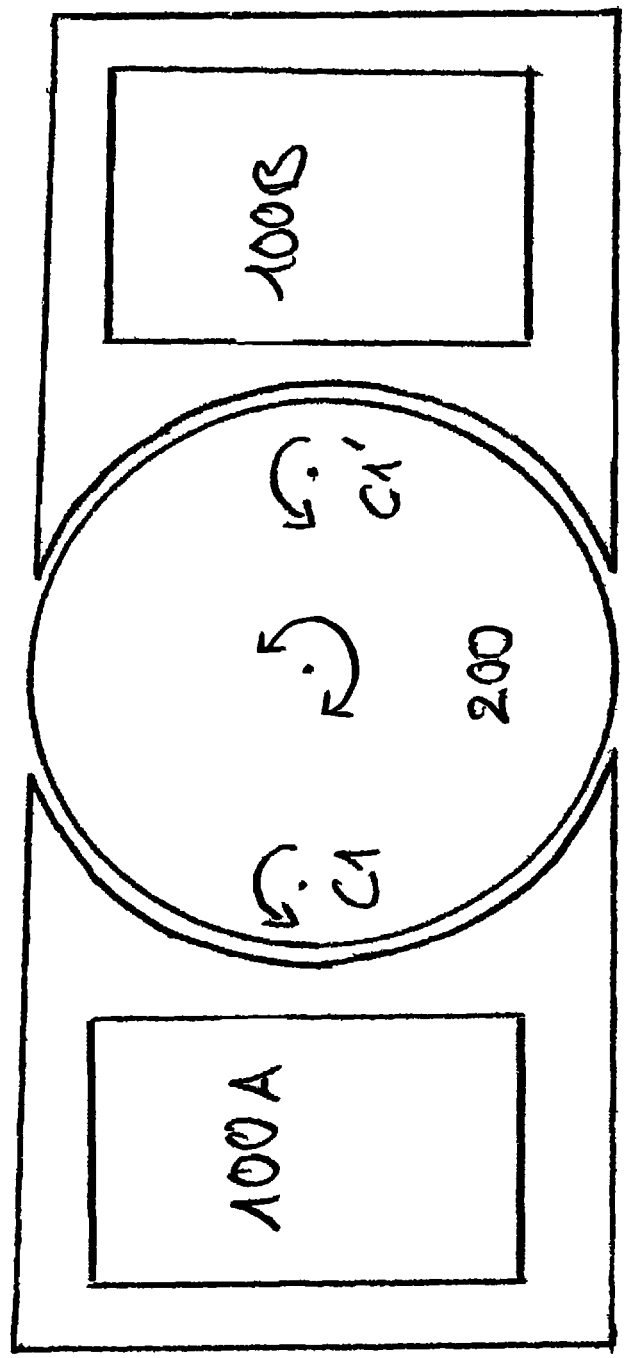

Further features, details and advantages of the invention can be found in the following description with reference to the accompanying drawings, in which FIGS. 1a, b and 2a, 2b are axial sectional views of a positioning capability for the second machining operation, FIG. 3a to c are axial sectional views of tool contours for the second operating region, FIG. 4 is an axial sectional view of a second machining operation of a tool according to FIG. 3b, FIG. 5 shows a machining operation of this type for a workpiece geometry which is different from that in FIG. 4, FIG. 6 shows a second machining operation for the tool from FIG. 3c, FIG. 7a to c show various relative positions between a tandem tool and a workpiece having a relatively complex toothing contour, in various deburring machining operations, FIG. 8a to c show illustrative projection views for showing an envelope of rolling positions of a tooth and the occurrence thereof, FIG. 9a to c show, in the same type of view as in FIG. 8, a possibility for mutually positioning the tool and the workpiece using the envelope, FIG. 10a to c show a shift of the envelope along a trajectory with respect to the workpiece toothing, FIG. 11 shows a skiving machine with the movement axes marked, and FIG. 12 is a schematic view of an alternative machine configuration to that from FIG. 11.

Figure 2:
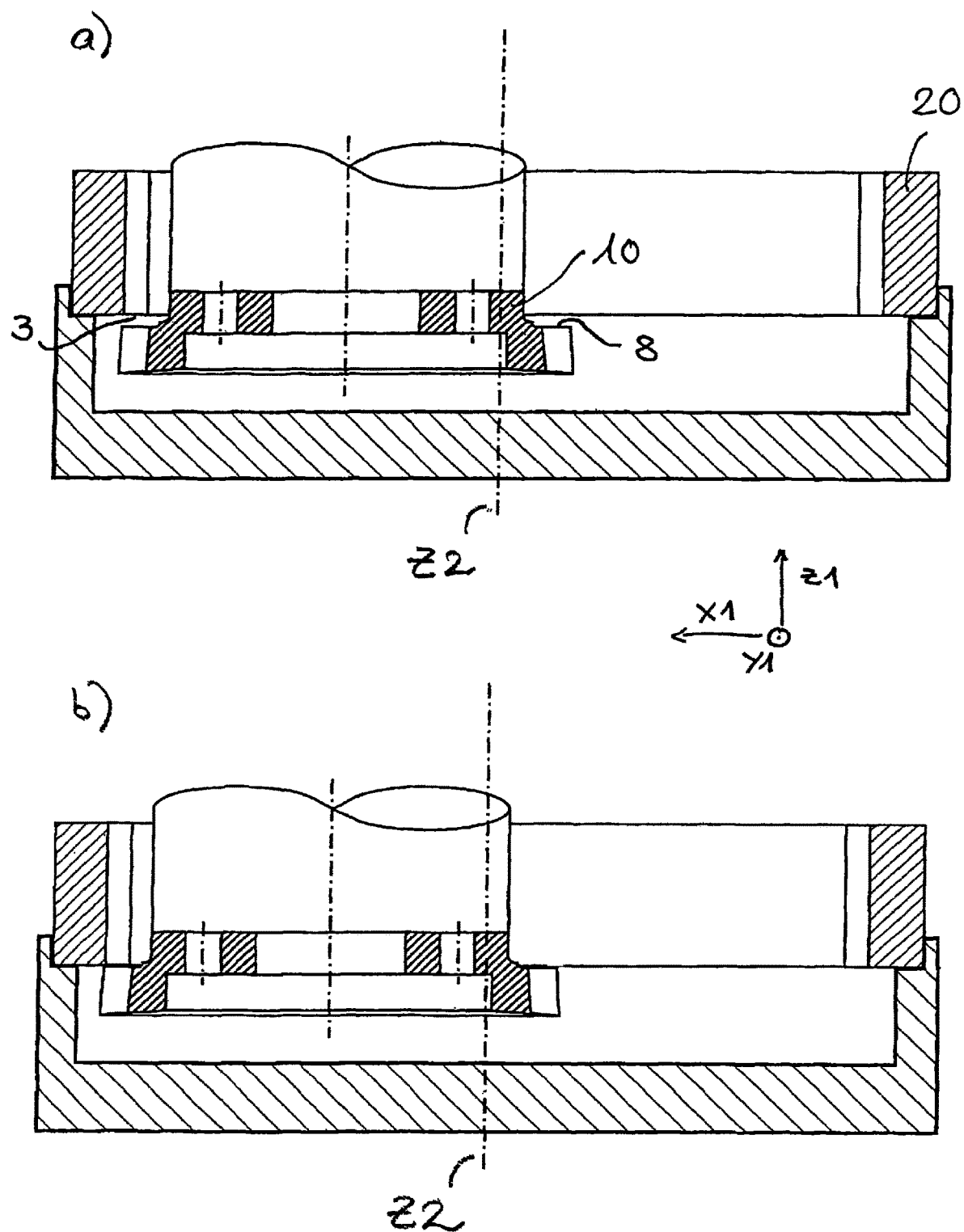

FIG. 1 and FIG. 2 show one embodiment of the method according to the invention. According to FIG. 1a, a workpiece 20 in the form of an internally toothed gearwheel comprising an internal toothing 2 is provided. During the production of the toothing 2, the workpiece 20 is clamped in a conventional manner on a workpiece spindle having the axis of rotation C1, said workpiece having the workpiece axis Z2 which extends vertically in this embodiment. Details about the clamping are not shown for the sake of clarity, the workpiece 20 merely appears on a support 30 of the workpiece clamping.

The internal toothing 2 is produced using a skiving wheel 10, which comprises, with respect to the wheel axis Z0 thereof, a toothing 4 on the peripheral surface thereof, which is remote from the clamping. In the (first) machining operation using the workpiece 20 to produce the toothing 2, the skiving wheel 10 rotates about the wheel axis Z0, which coincides with the rotational axis of rotation B1 of a tool spindle (not shown), in rolling coupling to the rotation of the workpiece 20 about the workpiece axis Z2.

The viewing direction of the view in FIG. 1a is that of a radial axis X1, with respect to which the tool 10 and the workpiece 20 can be moved relative to one another to set a desired centre distance from one another. FIG. 1 shows the axis-crossing angle ξ which is typical for skiving. The axis-crossing angle ξ can be set by a rotational axis A1, which can be implemented in the form of a rotation about an axis which is in parallel with or coaxial with the radial axis X1. This is shown by way of example. The skiving (power skiving) can also be carried out with a lateral offset and/or using a cylindrical tool.

On the end face of the skiving wheel toothing 4 which is remote from the clamping, the tooth edges 6 thereof form the operating region which has a cutting effect during the skiving of the toothing 2. During the production of the toothing 2, the skiving wheel 10 is shifted in one or more passes along the workpiece axis Z2 according to a corresponding radial infeed, towards the side of the toothing 2 at which the movement ends, in the case shown in FIG. 1, from top to bottom along the workpiece axis Z2. This axial end face of the toothing 2 at which the movement ends is denoted in FIG. 1b by the reference numeral 3.

The skiving wheel 10 is designed in such a way that, in a second machining operation, a machining is thus carried out on the side 3 of the toothing 2 at which the movement ends in order to shear off the burrs protruding from this toothing side 3. For this purpose, as shown in this embodiment which is being described, by adjusting the rotational movement axis A1, the skiving wheel 10 can be moved out of the position shown in FIG. 1a, which corresponds to that of the lower pass position during the production of the toothing 2, into the position shown in FIG. 1b, having the axis-crossing angle $\xi=0°$. As a result, a second operating region of the skiving wheel 10 in the form of the toothing 4 on the other end face 8 on the side of the skiving wheel clamping is oriented orthogonally to the workpiece axis Z2, that is to say in parallel with the side 3 of the toothing 2 which is formed in a planar manner and at which the movement ends. In this way, it is ensured that only the burrs are sheared off, without further collision with the tooth edges of the toothing 2.

The position of the skiving wheel 10 with respect to the workpiece 20, which is shown in FIG. 1, is reproduced again in FIG. 2a in a sectional view in which the plane of the paper is however given through the axes Z2 and the radial infeed axis X1. In the view in FIG. 2a, the skiving wheel 10 is already positioned with respect to the workpiece 20 through a radial (X1) feed motion in such a way that, when there is still a distance between the end faces 3, which are opposite one another in the region which is on the left in FIG. 2a, of the toothing 2 and 8 of the skiving wheel toothing 4, the tip circle of the toothing 4 at the end face 8 goes beyond the root circle of the produced toothing 2 in an overlapping manner. If the skiving wheel 10 is now moved in parallel with the workpiece axis Z2 towards the workpiece 20, from the relative position shown in FIG. 2a, the relative position shown in FIG. 2b is reached, in which the rear end face 8 of the skiving wheel toothing 4 (second operating region) and the end face 3 of the toothing 2 end up in a machining engagement (second machining operation) in which the burrs are sheared off the lower end face 3 of the toothing 2. Consequently, in the method variant from this embodiment, the deburring of the lower end face 3 is carried out using the same tool which also produces the toothing 2 (first machining operation) using the cutting tooth edges 6 on the front end face of the skiving wheel toothing 4 (first operating region).

Positioning the skiving wheel 10 in the position shown in FIG. 2b for the deburring machining is possible by means of already available control information for the Z2-axis-parallel movement. Alternatively, the deburring operation could also be detected using sensors, for example by means of an acoustic sensor or by means of the removal rate of the deburring which can be detected by means of the spindle axes B1 or C1 or the thrust axis, or also by means of an analysis of the vibration behaviour of the machine.

Before additional perspectives of the deburring process are described in greater detail, additional skiving wheel designs will be described with reference to FIG. 3a to c.

FIG. 3a is thus an axial sectional view of the skiving wheel 10 already shown in FIGS. 1 and 2, in which the rear end face 8 of the toothing 4 is formed so as to be planar, that is to say orthogonal to the skiving wheel axis Z0. This design is particularly suitable for a deburring process in the case of an axis-crossing angle $\xi=0°$, for example in the machining operation shown in FIG. 2b, which occurs with respect to the axes of the machine tool, in which the method is carried out, when the skiving wheel axis Z0, with respect to the available radial movement axis X1, aligns with the workpiece axis Z2 ($\lambda=0°$ position), but also in another angular position ($\lambda$) with respect to the connection direction of the two axes of rotation to the radial movement axis X1. Such a position can also be produced through a tangential movement axis Y1, which can extend orthogonally to the radial movement axis X1 and, in the case of an axis-crossing angle which is set to $\xi=0$, can preferably also extend orthogonally to a linear movement axis Z1, by means of which the skiving wheel 10 can be moved in parallel with the workpiece axis and which in particular extends in parallel with the workpiece axis Z0 (see also FIG. 11).

FIG. 3b is an axial sectional view of another skiving wheel 10', the rear end face 8' of which is formed, e.g. ground, at an angle with respect to the skiving wheel axis Z0 which differs from 90°. A skiving wheel designed in this way can advantageously be used when an end face 3', at which the movement ends, of the toothing to be produced is likewise inclined with respect to the plane which is perpendicular to the workpiece axis Z2, wherein the inclination of the end face 8' on the skiving wheel side is preferably adapted to that of the end face 3' on the workpiece side when the deburring is to be carried out in the $\xi=0°$ position, as shown in FIG. 4.

Secondly, it is indeed also possible to use the skiving wheel 10' shown in FIG. 3b to deburr planar workpiece toothing sides 3 by carrying out an orientation of the engaged surfaces 8' and 3 to avoid collision by means of a suitable setting of the axis-crossing angle $\xi$ during the deburring. This is shown in FIG. 5, which corresponds to FIG. 1a in terms of viewing direction, and thus shows the skiving wheel 10' in an angular position $\lambda=90°$. In this method variant, a greater spatial requirement under the workpiece 20 is to be taken into consideration, which can be produced by means of a base of the support 30' which is correspondingly located lower down. It is advantageous in this case that it is not necessary to change the axis-crossing angle $\xi$ between the skiving and the deburring.

It can be seen that the design of the second operating region, in this case, the rear end face 8 of the skiving wheel, can be used to create suitable collision-free positional relationships between the faces 3, 8 of the workpiece and the tool which face one another during the second machining operation (in this case the deburring). Furthermore, from a comparison of FIGS. 4 and 5, it can be seen that even axis settings can be used to achieve the collision-free mutual positioning of said faces 3, 8. Although it is not shown, it is also possible to combine these variants, in which for example an inclined or planar face 3 can be achieved in part through an inclination of the rear end face 8 of the skiving wheel toothing 4 and in part by setting an axis-crossing angle. For the gear shaping, the variant shown in FIG. 4 would be preferred.

FIG. 3c shows yet another variant in which with regard to an engagement situation, which is shown in FIG. 6, of the end face 3", at which the movement ends, of the workpiece toothing 2, the rear end face 8" is adapted in portions, wherein, in this embodiment which is shown, an outer portion 8"p is formed so as to be planar, whereas a portion 8"k which is adjacent thereto is formed so as to be conical, in order to carry out the second machining operation shown in FIG. 6 in a collision-free manner by adapting the inclination of the second portion 8"k to that of the inner portion of the lower end face 3".

As can further be seen from FIGS. 4, 5 and 6, a sufficient distance is to be created between the mounting projection of the skiving wheel 10 and the root circle of the toothing 4 on the rear end face 8, in order to avoid collisions with the workpiece toothing 2 during the deburring machining operation.

The skiving wheels 10, 10' and 10" shown in FIGS. 3a to 3c are formed so as to be conical, but cylindrical skiving wheels could also be used. The toothing on the side of the skiving wheel toothing 4 which forms the operating region for the production of the toothing 2, which toothing comprises the cutting tooth edges 6, can also be formed, as is conventional, in step grinding in the case of helical toothing of the skiving wheel; the invention is not further restricted in this regard.

The second operating region, in the example in FIG. 3, the rear end faces 8, 8', 8" of the skiving wheel toothing 4, can be ground for an advantageous deburring result and moreover can be provided with a protective layer in order to increase the durability of the second operating region. The tooth edges formed on the rear end face 8 can also be rounded in order to reduce the wear thereof.

Regardless of whether conical or cylindrical, straight-toothed or helically-toothed skiving wheels are used, it is preferable for the chamfer, which, in the case of conventional skiving wheels, is formed on the external diameter towards the rear of the skiving wheel, to not be present, but rather for the external diameter to extend along a straight line when viewed in the extension along the skiving wheel axis instead, since such a chamfer would make the intended deburring course more difficult.

In another embodiment, which is shown in an axial sectional view in FIGS. 7a, 7b and 7c, the tool is in the form of a tandem tool, and firstly comprises a skiving wheel 10 which can take for example the form of the skiving wheels shown in FIGS. 3a to 3c, in the embodiment shown in FIGS. 7a to 7c, for example the variant in FIG. 3a is used, and secondly another deburring tool 11 which is at a distance from said skiving wheel 10, wherein the tandem tool 10, 11 represents a tool arrangement which is rigidly coupled with respect to conjoint rotation. Thus for example a second toothing could be provided on the deburring tool 11, which toothing is arranged closer to the tool clamping than the skiving wheel itself (not shown), i.e. a toothing which is independent of the skiving wheel toothing 4 which supports the first operating region. An independent toothing design is then possible, and therefore the two operating regions can be optimised independently of one another for each machining operation. For example, the rear deburring region could be conically ground at the periphery and/or deposited in a concave manner on the end face in order to create a suitable deburring geometry. It is also conceivable for a second operating region of this type, which is closer to the tool clamping, to not be toothed, but rather to form for example a deburring disc without teeth.

Secondly, the situation shown in FIG. 7a to c is also conceivable, in which the second operating region can be arranged on the rear side 8 of the skiving wheel toothing 4 which supports the first operating region on the front side, and the second tool 11 of the tandem tool (the tool arrangement) is provided so as to be at an axial distance from the first operating region, but on the side which is remote from the clamping. Said second tool could for example be in the form of a disc, in particular could also bear toothing. Thus for example the deburring tool 11 shown in FIG. 7a is equipped with a toothing 14 which has a considerably smaller dimension with respect to the tool axis Z0 than the skiving wheel toothing 4. This also allows deburring on the outgoing side 3B of a toothing portion 2B, which is produced in that the toothing 2 of the workpiece 20' is interrupted by a groove 22; see FIG. 7b. Outgoing axial end faces 3A can also be machined where the toothing 2 of the workpiece 20' transitions from a portion of higher toothing 2A into the portion of lower toothing 2B. The second operating region for these (additional) burrs is the end face 18 of the toothing 14 which is at the top in FIG. 7a. This is shown in FIG. 7c.

FIG. 8a to c are schematic views of the formation of an overlapping region for a second machining operation which allows the deburring. FIG. 8a thus indicates the rolling movement of a tooth 5 of a deburring toothing, viewed from the perspective of a gap 22 in a workpiece toothing 2, which in this case is an internal toothing. The direction of rotation of the deburring tool and the workpiece is in the counter-clockwise direction. This view in projection onto a normal plane relative to the workpiece axis illustrates (FIG. 8B) that the snapshots 5', 5", etc. of the tooth 5 during the rolling movement form an envelope curve 55 which is disclosed by the outer contour of all the rolling positions 5, 5", etc. with respect to the gap 22. Said envelope curve 55 is shown only in FIG. 8c, i.e. without the illustration of the individual rolling positions 5', 5", etc. of the tooth 5.

It can be seen that, by means of a relative positioning of the envelope curve 55 with respect to the gap 22 in the toothing 2, an overlapping region of the envelope 55 and the tooth profile can be varied, and thus allows deburring in each region of the toothing on the end face thereof. By changing the relative positioning, the overlapping region can for example be shifted successively, by means of which the end face and the tooth gap 22 can be completely deburred.

In the following, a few variants will be discussed, by means of which the second machining operation and the creation of each overlapping region of the envelope curve 55 can be produced. In order to simplify the illustration, recourse will no longer be made to the individual rolling positions 5', 5", etc. of a deburring tooth 5, but rather to the envelope curve 55 formed by the rolling movement of the tooth 5.

Thus for example FIG. 9a shows positioning of the envelope curve 55 by a radial infeed of the deburring tool with respect to the gap 22 in the toothing 2 in the same view as that in FIGS. 8a to 8c, wherein the deburring tool end face is opposite the toothing end face 3 to be deburred, at a distance therefrom. From an intermediate position corresponding to FIG. 8c (the tip circle of the tool overlaps the root circle of the workpiece, the root circle of the tool does not overlap the tip circle of the workpiece), the envelope curve 55 is subsequently shifted with respect to the tooth gap 22 in such a way that the positional relationship shown in FIG. 9b is produced, in which the overlapping region comprises the right flank 22R of the tooth gap 22 and part of the root region thereof. The positioning movement required for this purpose can be achieved by means of linear movement axes, for example by means of the tangential linear movement axis Y, or by a rotation of the tool and the workpiece with respect to one another, for example by applying an additional rotation $\Delta B1$ or $\Delta C1$ or a combination of these types of movements.

As a result of the maintained rotational movement coupling of the rolling movement of the tool and the workpiece, in the relative position shown in FIG. 9b, the end face 3 of the toothing 2 to be deburred is deburred on all the tooth edges of the right flank as soon as the deburring tool end face 8 engages with the workpiece end face 3 to be deburred in that they are moved axially closer together, in which engagement the burrs are sheared off. These views are somewhat simplified for explanatory purposes. Thus the change in the envelope which is disclosed to a person skilled in the art when the centre distance changes due to the change in the pitch circle diameter will not be described in greater detail.

Subsequently, in the same way, the deburring of the toothing end face 3 could be carried out on the left flanks 22L (and the left-hand flank root region), as shown in FIG. 9c, in that the overlapping region is not shifted to the right, but rather to the left with respect to FIG. 8c, by means of the movement axes which are indicated with respect to the description of FIG. 9b. It can be seen that, in this way, a sufficient overlap in each case of the envelopes 55 of the rolling movement positions 5', 5", etc. of a tool tooth 5 with each flank 22R, 22L and the bottom of the end face 3 of the toothing 2 to be deburred is achieved so that the burr which is present thereon in the form of a material protrusion is completely sheared off. Where necessary, the tool is to dwell in each deburring position for a certain amount of time. The sequence of right flank to left flank can of course be reversed, and the exact manner of the shift can be modified. The directions of rotation of the toothing 2 and the tool can also each be reversed.

The shear-off movement for the deburring in this case is preferably set in such a way that a movement component of the shear-off movement, which is located in the plane of the paper in FIGS. 8 and 9 and is perpendicular to the toothing flank of the workpiece toothing, is directed away from the gap in the toothing 2, that is to say that the shearing-off is carried out from the gap towards the toothing material. For this purpose, it can be provided to reverse the direction of rotation of the tool and the workpiece in each case, before the relative position shown in FIG. 9c is occupied.

Instead of another radial infeed for the other flank sides, between the deburring on the sides of the left and right toothing flanks 22L, 22R, a transition could also be made directly between the two relative positions shown in FIGS. 9b and 9c, wherein during this change in the deburring positions, the end faces 3, 8 which are engaged are preferably axially lifted off one another. It is understood, as is also already the case in relation to the variants shown with reference to FIGS. 9a to 9c, that the movements "radial infeed" or "moving axially closer" do not necessarily have to be carried out in an axis-parallel manner, but rather require merely a movement directional component in these directions. In particular in the case of an inclined end face 3 to be machined, the vertical axis Z1 can be incorporated. Provided that the direction of rotation of the workpiece and the tool does not change, the deburring toothing 4 and the deburred toothing 2 can rotate together in the counter-clockwise direction and in the clockwise direction (in the case of an internal toothing to be deburred), wherein in the case of an external toothing to be deburred, the directions of rotation of the tool and the workpiece are mutually opposed in order to achieve the rolling coupling.

By means of a lower radial infeed, the overlapping region can also be enlarged to such an extent that the deburring is carried out on both sides of the gap at the same time. The toothing of the tool can also be adapted in such a way that complete deburring of the entire gap is already achieved by means of a radial infeed alone.

FIGS. 10a to 10c show a variant in which the envelope curve 55 is moved along a preset path with respect to the gap 22 in the toothing 2. In this embodiment, the direction of rotation of the tool and the workpiece is counter-clockwise, and by means of an axial infeed (Z1), the toothing end faces 3, 8 which are opposite one another in the machining operation are moved closer together to an axial machining proximity, and by means of the available radial, tangential and/or rotational movement axes, the envelope curve 55 is shifted into the position shown in FIG. 10a, close to the tip circle of the right flank 22R of the gap 22 in the toothing 2. From there, the envelope is "shifted" (the relative positions of the tool and the workpiece are of course changed) in parallel with the end face to be deburred in the plane of the paper in FIG. 10 along the right flank 22R from the tip circle towards the root circle (FIG. 10B), through the bottom and then from the bottom of the gap 22 along the left flank 22L back towards the tip circle of the toothing 2, by means of which the end face 3 to be deburred is deburred along this movement path, in the continuous process on all the gaps.

It can be seen from FIGS. 10a to 10c that in order to carry out such a path, movement components are required both in the radial (X) and in the tangential (Y) direction. For the tangential directional components (Y), however, the above-mentioned additional rotations ΔB1, ΔC1 can also be used, and therefore, in principle, this deburring variant can also be carried out without using a third linear movement axis (Y). If the required path is not located in a plane which is orthogonal to the workpiece axis of rotation, the Z1 movement axis is available (for example in the case of an inclined workpiece lower face 3).

Instead of the variants described with reference to FIGS. 10a to 10c, in the case of these deburring processes which are carried out by moving the envelope curve 55 along a movement path, the path could also be passed through in the opposite direction, and also in the case of a respectively reversed direction of rotation of the workpiece and the tool, wherein the shear-off movements during the deburring in turn are to be directed away from the gap as much as possible.

In this context, the variant described with reference to FIGS. 10a to 10c can be modified further, in that between the deburring on the first path portion (along the right flank 22R) and the deburring on the second path portion (along the left flank 22L), the respective directions of rotation of the workpiece and the tool are switched to the counter-clockwise direction. However, it is also possible to machine in the clockwise direction in the first machining portion, and then to machine in the counter-clockwise direction in the second machining portion. The movement path described in FIGS. 10a to 10c could also be passed through in the other direction, that is to say that deburring could be carried out firstly along the left flank 22L and then along the right flank 22R, with or without a change in the direction of rotation.

Furthermore, it is also conceivable to pass through the movement path in portions. For example, it is possible to run along the right toothing flank 22R starting at the root circle towards the tip circle, and also along the left toothing flank 22L, in each case in the clockwise direction or counter-clockwise direction or also with interposed changes in the direction of rotation.

It can be seen that there are various possibilities for positioning a toothed deburring tool in rolling coupling with the toothing to be deburred for the deburring machining operation so that a complete deburring of the workpiece can be carried out on the end face thereof without removing material from, causing deformation to or having any other effects on the tooth edges themselves, in particular by means of a shear-off movement away from the gap in the deburred toothing.

FIG. 11 shows another toothing machine which has enough machine axes for carrying out the variants according to the invention. The toothing machine 100, which is specially configured for skiving, comprises on the machine bed 60 thereof firstly a workpiece spindle (table spindle) having an axis of rotation C1, on which an externally or internally toothed workpiece comprising conventional clamping means can be clamped. On the tool side, a radial carriage 62 which can be moved in the radial direction X1 on the machine bed 60 is provided, which is constructed in the manner of a tower and supports a vertical carriage 64 on a side which faces the workpiece spindle, which carriage can be moved with respect to the radial carriage 62 in parallel with the axis of the workpiece spindle with the movement direction Z1. The vertical carriage 64 in turn supports a tangential carriage 66, which is mounted so as to rotate about an axis which is in parallel with the radial axis X1, so that an axis-crossing angle ξ between the workpiece axis and the tool axis can be set by means of the rotational movement A1. In the rotational position shown in FIG. 11 (pivot angle=0), the movement axis Y1 of the tangential carriage 66 is orthogonal to the radial movement axis X1 and the vertical movement axis Z1. Arranged on the tangential carriage 66 is a tool head 68, comprising a tool spindle defining an axis of rotation B1 for receiving a cutting wheel, for example a skiving tool and/or a deburring tool, wherein the deburring tool can also be in the form of a tandem tool.

FIG. 12 is another schematic view of a machine configuration in which a workpiece (not shown) which can be rotated about the axis of rotation C1 which is shown in FIG. 12 can be machined by a tool of a tool block 100A, which for example can be constructed in the same way as the tool-side portion of the single-spindle machine shown in FIG. 11. In this configuration, a second tool-side block 100B is provided in a diametrically opposed manner, which can be constructed in functionally the same way as the tool block 100A, that is to say can have the same movement axes with respect to the position of the workpiece axis of rotation C1' marked in FIG. 12. Due to the fact that the rotational positioning unit 200, which comprises the clampings for the axes of rotation C1, C1' and in particular comprises, in a rotationally coupled manner, the corresponding workpiece spindle axes, can be rotated by 180°, on the left in FIG. 12, for example the skiving process is carried out and, as a result, a toothing is produced on a workpiece, whereas on the right in FIG. 12, the deburring operation can be carried out according to one or more of the above-described aspects of the method. For this purpose, the tool block 100A is equipped with a skiving wheel, whereas the tool block 100B is equipped with a deburring tool according to any of the above-described deburring tool arrangements. In addition, a controller of the tool block 100B can control the deburring method according to any of the above aspects of the method with regard to the deburring. Workpiece changers are not shown, which for example can be arranged in such a way that the respective workpieces are changed in the rotational position of the rotational positioning plate 200 after the deburring on the tool block 100B, which workpieces are clamped about the axis of rotation C1' in the view in FIG. 12. However, in one modification, it would also be possible to arrange the blocks 100A, 100B in such a way that they are offset from one another by only 120°, and to arrange a workpiece change position in the remaining 120° position of a 120° pulse of the rotational positioning plate 200. It is also possible for example to maintain the arrangements of the tool blocks 100A, 100B in the diametrically opposed position shown in FIG. 12, and to arrange workpiece changers at the 90° rotational positions which are not occupied in FIG. 12. Since, in any case, it is provided in particular that all the movement axes of the tool block 100A are available to the tool block 100B, a machine which is equipped in this way could also be operated in another operating mode in which both the production of the workpiece toothing (first machining operation) and the deburring (second machining operation) are carried out on both tool blocks 100A, 100B. Depending on the type of workpieces to be machined and the resulting ratio from the time required to produce the toothing and the time required to carry out the deburring, a machine which is configured in this way can replace the functions of two separate machines with respect to machining, but also has the advantage over said machines of the processes of loading and unloading the workpieces, which processes are coupled by means of the rotational positioning plate 200 and can be carried out in the 90° positions at the same time as the machining of other workpieces on the tool blocks 100A, 100B, without requiring correspondingly twice the spatial requirement therefor. Secondly, in the previously described operating mode, different machining could be carried out on the two tool blocks 100A, 100B. In this context, a loading and unloading system can be used, which can transfer workpieces to the rotational positioning plate 200 and receive workpieces therefrom both in the 180° position and in the 90° position.

The details of the above description with reference to the accompanying drawings are not to be interpreted as having a limiting effect on the invention. Rather, the individual features of the description and the following claims can be essential in isolation or in combination for implementing the invention in the various embodiments thereof.

The invention claimed is:

1. Method for machining a workpiece (20; 20'), wherein in a power skiving method a toothing (2; 2A; 2B) is produced on the workpiece in a first machining operation, in which a toothed cutting wheel (10), which rotates about the axis of rotation (Z0) thereof and, on a first end face, comprises cutting edges (6) on the toothing (4) thereof, is coupled in a rolling manner with the workpiece which rotates about the axis of rotation (Z2) thereof, and a cutting movement of the cutting edges, which has directional components in parallel with the workpiece axis, ends at an axial side (3; 3A, 3B) of the workpiece toothing, the cutting edges of the cutting wheel forming a first operating region which can be positioned with respect to the workpiece by means of movement axes, and in which, in a second machining operation using a second operating region (8; 18) wherein the second operating region is formed close to a second end face of the cutting wheel by means of the cutting wheel toothing (4), the workpiece is deburred on the side (3; 3A, 3B) of the workpiece toothing at which the cutting movement ends, characterised in that the second operating region can be positioned with respect to the workpiece by means of the same movement axes as the first operating region, and is coupled for movement to the first operating region.

2. Method according to claim 1, wherein the second operating region can be rotated about an axis of rotation (Z0), which, in the second machining operation, extends coaxially with a tool spindle axis which extends coaxially with the axis of rotation (Z2) of the cutting wheel in the first machining operation, wherein the first and the second operating region are rotationally coupled (B1) by means of the same axis of rotation.

3. Method according to claim 1 wherein the second operating region is formed by a toothing.

4. Method according to claim 1 wherein the second operating region is located behind the first operating region with respect to the cutting movement directional component which is in parallel with the workpiece axis.

5. Method according to claim 1 wherein the second operating region is formed on a second cutting wheel (11), which is rigidly connected to the cutting wheel of the first machining operation, and the dimension of which in the direction of the cutting wheel axis is less than that of the first cutting wheel.

6. Method according to claim 3 wherein, in the second machining operation, the tip circle of the toothing of the second operating region is made to overlap with the root circle of the workpiece toothing.

7. Method according to claim 3 wherein, in the second machining operation, when with respect to a projection onto a plane which is orthogonal to the workpiece axis, a flank region of the workpiece toothing is made to overlap with a toothing flank region of the second operating region.

8. Method according to claim 1 wherein, in the second machining operation, any burrs which have been formed as a result of the production of the workpiece toothing on the side thereof at which the cutting movement ends are sheared off.

9. Method according to claim 8, wherein the shearing-off of the burrs is carried out by means of a shearing movement, which is directed away from a gap (22) in the workpiece toothing, on one and on another of the tooth flanks (22R, 22L) defining the gap, and on a tooth root region of the gap.

10. Method according to claim 9 wherein, in the second machining operation, machining is carried out on said one and said another toothing flanks one after the other.

11. Method according to claim 10, wherein, in the second machining operation, between the machining on the left and right flanks, the direction of the workpiece rotation is reversed, and a direction of rotation of the second operating region is also reversed.

12. Method according to claim 1 wherein the second operating region is initially positioned behind the side of the workpiece toothing at which the movement ends, with respect to the cutting movement component which is in parallel with the workpiece axis, then the distance thereof from the workpiece axis is changed, and said region is moved against the cutting movement component which is in parallel with the workpiece axis for the second machining operation.

13. Method according to claim 1 wherein the workpiece axis of rotation and the axis of rotation of the second operating region are driven at a predetermined speed ratio for the second machining operation.

14. Method according to claim 6 wherein, for the second machining operation, to produce overlapping, an additional rotation (ΔB1; ΔC1) of the workpiece and/or tool is carried out.

15. Method according to claim 1 wherein, in the second machining operation, a relative movement having directional components which extend radially (X1) with respect to the workpiece axis is carried out.

16. Method according to claim 3 wherein, in the second machining operation, a mutual change in position between the workpiece and an envelope (55) of rolling positions (5', 5", etc.) of a tooth (5) of the second operating region is carried out, wherein the envelope is moved along a path having tangential (Y1) and radial components (X1).

17. Method according to claim 1 wherein the movement axes comprise a first linear movement axis (Z1) having a directional component in parallel with the workpiece axis, and a second linear movement axis (X1) having a directional component which is orthogonal to the first linear movement axis, and a third linear movement axis (Y1) having a directional component which is orthogonal to the plane spanned by the first and second linear movement axes.

18. Method according to claim 1 wherein the movement axes comprise a rotational axis (A1) for setting an axis-crossing angle (ξ) between the workpiece axis and the cutting wheel axis.

19. Method according to claim 1 wherein, in the second machining operation, an orientation of a tool-side end face which faces the end face (8, 8', 8") of the workpiece toothing on the side at which the movement ends is adapted to the orientation of the workpiece end face by means of tool shaping which is adapted to the machine axis settings in the second machining operation and/or by means of settings of the machine axes which are adapted to the shape of the tool in the second machining operation.

20. Method according to claim 1 wherein contacting in the second machining operation is detected using sensors.

21. Tool arrangement for carrying out the second machining operation of a method according to claim 1, comprising the second operating region (8), which is formed by a toothing, wherein the tool arrangement comprises the cutting wheel (10) having the first operating region (6).

22. Tool arrangement according to claim 21, wherein the second operating region is formed by the cutting wheel toothing (4) on the second end face (8) thereof.

23. Tool arrangement according to claim 22, wherein the second operating region is formed on a second cutting wheel (11) which is at an axial distance from the cutting wheel comprising the first operating region.

24. Tool according to claim 21 wherein the second operating region is ground and/or coated, and the tooth edges thereof are rounded.

25. Machine tool (100) comprising at least one workpiece spindle for receiving a workpiece and at least one tool spindle for receiving a tool and a control unit, characterised in that the control unit is equipped with a control program which controls the machine tool in order to carry out a method according to claim 1 on a workpiece (20) which is received on at least one of the at least one workpiece spindle, using at least one tool (10) which is received on at least one of the at least one tool spindle.

* * * * *